US012183205B2

(12) United States Patent
Horihata

(10) Patent No.: US 12,183,205 B2
(45) Date of Patent: Dec. 31, 2024

(54) OBSTACLE INFORMATION MANAGEMENT DEVICE, OBSTACLE INFORMATION MANAGEMENT METHOD, AND DEVICE FOR VEHICLE

(71) Applicant: DENSO CORPORATION, Kariya (JP)

(72) Inventor: Satoshi Horihata, Kariya (JP)

(73) Assignee: DENSO CORPORATION, Kariya (JP)

( * ) Notice: Subject to any disclaimer, the term of this patent is extended or adjusted under 35 U.S.C. 154(b) by 206 days.

(21) Appl. No.: 18/068,080

(22) Filed: Dec. 19, 2022

(65) Prior Publication Data

US 2023/0120095 A1 Apr. 20, 2023

Related U.S. Application Data

(63) Continuation of application No. PCT/JP2021/021494, filed on Jun. 7, 2021.

(30) Foreign Application Priority Data

Jun. 23, 2020 (JP) ................................ 2020-107961

(51) Int. Cl.
*G08G 1/01* (2006.01)
*G08G 1/16* (2006.01)

(52) U.S. Cl.
CPC ........... *G08G 1/164* (2013.01); *G08G 1/0112* (2013.01); *G08G 1/0141* (2013.01); *G08G 1/0145* (2013.01); *G08G 1/166* (2013.01)

(58) Field of Classification Search
CPC .... G08G 1/164; G08G 1/0112; G08G 1/0141; G08G 1/0145; G08G 1/166
See application file for complete search history.

(56) References Cited

FOREIGN PATENT DOCUMENTS

JP 2008234044 A 10/2008
JP 2019040539 A 3/2019

OTHER PUBLICATIONS

U.S. Appl. No. 18/068,212, filed Dec. 19, 2022, Horihata.

*Primary Examiner* — Mathew Franklin Gordon
(74) *Attorney, Agent, or Firm* — Harness, Dickey & Pierce, P.L.C.

(57) ABSTRACT

An obstacle information management device includes a vehicle behavior acquisition unit that is configured to acquire vehicle behavior data indicative of behaviors of a plurality of vehicles in association with position information; an appearance determination unit that is configured to specify a point, as an obstacle registration point, where an obstacle has appeared based on the vehicle behavior data acquired by the vehicle behavior acquisition unit; and a disappearance determination unit that is configured to determine, based on the vehicle behavior data acquired by the vehicle behavior acquisition unit, whether the obstacle remains or has disappeared at the obstacle registration point where the obstacle was determined to exist by the appearance determination unit.

19 Claims, 16 Drawing Sheets

FIG. 20

| IMAGE CONFIRMATION RESULT (SERVER) | RECOGNITION RESULT (VEHICLE REPORT) | NUMBER OF AVOIDANCE VEHICLES FOR APPEARANCE DETERMINATION |
|---|---|---|
| ○ | ○ | 1 |
| ○ | × | 3 |
| UNIDENTIFIED | ○ | 2 |
| UNIDENTIFIED | × | 4 |
| × | ○ | 6 |
| × | × | 8 |

○ : DETERMINE THAT OBSTACLE EXISTS
× : DETERMINE THAT OBSTACLE DOES NOT EXIST

FIG. 21

| IMAGE CONFIRMATION RESULT (SERVER) | RECOGNITION RESULT (VEHICLE REPORT) | NUMBER OF STRAIGHT TRAVELING VEHICLES FOR DISAPPEARANCE DETERMINATION |
|---|---|---|
| × | × | 2 |
| × | ○ | 4 |
| UNIDENTIFIED | × | 3 |
| UNIDENTIFIED | ○ | 5 |
| ○ | × | 8 |
| ○ | ○ | 10 |

× : DETERMINE THAT OBSTACLE DOES NOT EXIST
○ : DETERMINE THAT OBSTACLE EXISTS

| CAMERA | RADAR | VEHICLE BEHAVIOR | DETECTION RELIABILITY |
|---|---|---|---|
| ○ | ○ | ○ | 10 |
| ○ | × | ○ | 9 |
| × | ○ | ○ | 9 |
| × | × | ○ | 8 |
| ○ | ○ | × | 7 |
| ○ | × | × | 4 |
| × | ○ | × | 4 |
| × | × | × | 0 |

○ : OBSTACLE DETECTED/AVOIDANCE ACTION PERFORMED
× : OBSTACLE NOT DETECTED/NO AVOIDANCE ACTION PERFORMED

OBSTACLE INFORMATION MANAGEMENT DEVICE, OBSTACLE INFORMATION MANAGEMENT METHOD, AND DEVICE FOR VEHICLE

CROSS REFERENCE TO RELATED APPLICATIONS

The present application is a continuation application of International Patent Application No. PCT/JP2021/021494 filed on Jun. 7, 2021, which designated the U.S. and claims the benefit of priority from Japanese Patent Application No. 2020-107961 filed on Jun. 23, 2020. The entire disclosures of all of the above applications are incorporated herein by reference.

TECHNICAL FIELD

The present disclosure relates to an obstacle information management device and an obstacle information management method for determining an existence state of an obstacle serving as an object that obstructs vehicle traffic.

BACKGROUND ART

As a technology related to road obstacle detection, there has been known a configuration for detecting a fallen object on a road from an image captured by an vehicle-mounted camera.

SUMMARY

According to one aspect of the present disclosure, an obstacle information management device comprises a vehicle behavior acquisition unit that is configured to acquire vehicle behavior data indicative of behaviors of a plurality of vehicles in association with position information; an appearance determination unit that is configured to specify a point, as an obstacle registration point, where an obstacle has appeared based on the vehicle behavior data acquired by the vehicle behavior acquisition unit; a disappearance determination unit that is configured to determine, based on the vehicle behavior data acquired by the vehicle behavior acquisition unit, whether the obstacle remains or has disappeared at the obstacle registration point where the obstacle was determined to exist by the appearance determination unit; distribution processing unit that is configured to distribute information on the obstacle to the vehicles; and probability calculation unit that is configured to calculate an actual existence probability indicative of a degree of possibility that the obstacle exists at the obstacle registration point. The distribution processing unit is configured to distribute an obstacle notification packet which is a communication packet indicative of the information on the obstacle to the vehicles that are scheduled to pass through the obstacle registration point. The obstacle notification packet includes the actual existence probability calculated by the probability calculation unit.

BRIEF DESCRIPTION OF DRAWINGS

FIG. 20 is a figure illustrating an example of a reference for the appearance determination unit to determine that an obstacle exists.

FIG. 21 is a figure illustrating an example of a reference for a disappearance determination unit to determine that an obstacle has disappeared.

DESCRIPTION OF EMBODIMENTS

Figure 1:
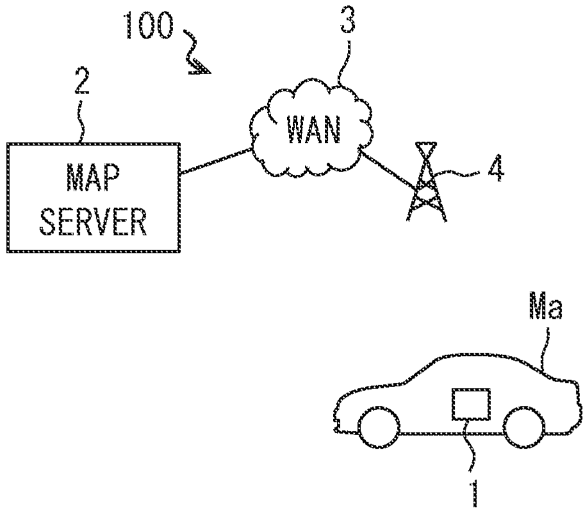
FIG. 1 is a figure describing a configuration of an obstacle information distribution system.

To begin with, a relevant technology will be described first only for understanding A vehicle uses the vehicle-mounted camera to confirm whether the fallen object notified by a server still remains, and returns a result thereof to the server. The server updates an existence state of the fallen object, based on the confirmation result received from the vehicle. Another configuration as follows is also wellknown. The server roughly predicts a time required for removing the fallen object, based on a type of the fallen object, and distributes a predicted time thereof to the vehicle.

Conventionally, the fallen object is detected by analyzing the image captured by the vehicle-mounted camera. Therefore, conventionally, the presence or absence of the fallen object can only be confirmed by a vehicle equipped with a camera. In rainy weather, at night, or in a case of backlight, accuracy in confirming the image deteriorates. Therefore, there is a possibility of erroneous determination that there is no fallen object even though the fallen object exists.

The present disclosure is made based on the above-described circumstances, and one of objectives thereof is to provide an obstacle information management device, an obstacle information management method, and a vehicle device which can detect disappearance of an obstacle without using an image of an vehicle-mounted camera.

An obstacle information management device includes a vehicle behavior acquisition unit that is configured to acquire vehicle behavior data indicative of behaviors of a plurality of vehicles in association with position information; an appearance determination unit that is configured to specify a point, as an obstacle registration point, where an obstacle has appeared based on the vehicle behavior data acquired by the vehicle behavior acquisition unit; a disappearance determination unit that is configured to determine, based on the vehicle behavior data acquired by the vehicle behavior acquisition unit, whether the obstacle remains or has disappeared at the obstacle registration point where the obstacle was determined to exist by the appearance determination unit; distribution processing unit that is configured to distribute information on the obstacle to the vehicles; and probability calculation unit that is configured to calculate an actual existence probability indicative of a degree of possibility that the obstacle exists at the obstacle registration point. The distribution processing unit is configured to distribute an obstacle notification packet which is a communication packet indicative of the information on the obstacle to the vehicles that are scheduled to pass through the obstacle registration point. The obstacle notification packet includes the actual existence probability calculated by the probability calculation unit.

According to the above-described configuration, a disappearance determination unit determines whether the obstacle remains or has disappeared, based on a behavior of a vehicle passing through an obstacle registration point. In the configuration, it is not necessary to use the image of the vehicle-mounted camera. In other words, a disappearance of the obstacle can be detected without using the image of the vehicle-mounted camera.

In another aspect of the present disclosure, an obstacle information management method for managing position information of an obstacle existing on a road is executed by at least one processor. The obstacle information management method includes: acquiring vehicle behavior data indicative of a vehicle behavior of each of a plurality of vehicles in association with each point; specifying a point, as an obstacle registration point, where the obstacle has appeared based on the acquired vehicle behavior data; and determining, based on the acquired vehicle behavior data, whether the obstacle remains or has disappeared at the obstacle registration point where the obstacle is determined to exist.

According to the above-described configuration, a disappearance of the obstacle can be detected without using the image of the vehicle-mounted camera, by adopting the same action as that of the obstacle information management device.

In yet another aspect of the present disclosure, there is provided a vehicle device for transmitting information on a point of an obstacle existing on a road to a predetermined server. The vehicle device includes: an obstacle point information acquisition unit that is configured to acquire, by communicating with the server, information on an obstacle registration point where the obstacle is determined to exists; a vehicle behavior detection unit that is configured to detect a behavior of at least one of a subject vehicle and another vehicle based on at least one of an input signal from a vehicle state sensor for detecting a physical state amount indicative of the behavior of the subject vehicle, an input signal from a surrounding monitoring sensor, and data received via inter-vehicle communication; and a report processing unit that is configured to transmit vehicle behavior data indicative of the behavior of at least one of the subject vehicle and the other vehicle to the server when the subject vehicle passes through a point within a predetermined distance from the obstacle registration point.

The vehicle device transmits vehicle behavior data indicating a behavior of a subject vehicle or another vehicle when the vehicle passes through the vicinity of an obstacle registration point notified from a server, to the server. When the obstacle remains and the subject vehicle and/or the other vehicle travel on a lane on which the obstacle exists, vehicle behavior data received by the server is data indicating that the obstacle is avoided. On the other hand, when the obstacle has disappeared, a vehicle behavior for avoiding the obstacle is no longer observed. That is, the vehicle behavior data when the vehicle passes through the vicinity of the obstacle registration point functions as an index indicating whether the obstacle remains. According to the above-described vehicle device, the server collects information as a determination criterion for determining whether the obstacle remains. Based on the vehicle behavior data provided from multiple vehicles, the server can specify whether the obstacle still remains or has disappeared at the obstacle registration point.

Hereinafter, an embodiment of the present disclosure will be described below with reference to the drawings. FIG. 1 is a figure illustrating an example of a schematic configuration of an obstacle information distribution system 100 according to the present disclosure. As illustrated in FIG. 1, the obstacle information distribution system 100 includes multiple in-vehicle systems 1 built in each of multiple vehicles Ma and Mb, and a map server 2. In FIG. 1, for convenience, only two vehicles of the vehicle Ma and the vehicle Mb are illustrated as vehicles on which the in-vehicle system 1 is mounted, but actually, three or more vehicles exist. The in-vehicle system 1 can be mounted on a vehicle that can travel on a road, and the vehicles Ma and Mb may be a two-wheeled vehicle or a three-wheeled vehicle in addition to a four-wheeled vehicle. A motorized bicycle can also be included in the two-wheeled vehicle. Hereinafter, when viewed from the in-vehicle system 1, a vehicle on which the system (that is, the system itself) is mounted will also be referred to as a subject vehicle.

<Overview of Overall Configuration>

The in-vehicle system 1 mounted on each vehicle is configured to be wirelessly connectable to a wide area communication network 3. Here, the wide area communication network 3 indicates a public communication network provided by a telecommunication carrier, such as a cellular phone network and the Internet. A base station 4 illustrated in FIG. 1 is a wireless base station for the in-vehicle system 1 to be connected to the wide area communication network 3.

Each in-vehicle system 1 transmits a vehicle condition report which is a communication packet indicating a condition of the subject vehicle, to the map server 2 via the base station 4 and the wide area communication network 3 at a predetermined cycle. The vehicle condition report includes transmission source information indicating the vehicle which transmits the communication packet (that is, a transmission source vehicle), a generation time of the data, and a current position of the transmission source vehicle. The transmission source information is identification information (so-called vehicle ID) previously allocated to the transmission source vehicle to distinguish the transmission source vehicle from other vehicles. In addition to the above-described information, the vehicle condition report may include a traveling direction of the subject vehicle, a traveling lane ID, a traveling speed, acceleration, and a yaw rate. The traveling lane ID indicates whether the subject vehicle travels on any number lane from a left end or right end roadside. Furthermore, the vehicle condition report may include information such as a lighting state of a direction indicator and whether the vehicle travels across a lane boundary.

Each in-vehicle system 1 uploads a communication packet (hereinafter, referred to as an obstacle point report) indicating information related to an obstacle point notified from the map server 2, to the map server 2. The information related to the obstacle point is information used as a determination criterion for the map server 2 to determine an existence state of the obstacle on the road. The obstacle point report may be included in the vehicle condition report. The obstacle point report and the vehicle condition report may be separately transmitted.

The map server 2 detects a position where the obstacle exists or a point where the obstacle has disappeared, based on the obstacle point report uploaded from each vehicle. The information related to appearance/disappearance of the obstacle is distributed by using a multicast method to the vehicles to which the information needs to be distributed.

The map server 2 has a function of managing the current position of each vehicle, as a sub-function for determining a distribution destination of information on the appearance/disappearance of the obstacle. Management of the current position of each vehicle may be realized by using a vehicle position database (to be described later). In the database, the current position of each vehicle is stored in association with a vehicle ID. Each time the map server 2 receives the vehicle condition report, the map server 2 indicates contents of the vehicle condition report, and updates the current position of the transmission source vehicle registered in the database. In a configuration for pull-based distribution of the obstacle information, a configuration for determining a distribution destination of the obstacle information such as a vehicle position base is not necessarily required. The function of managing a position of each vehicle for determining the distribution destination is an optional element. Transmitting the vehicle condition report in the in-vehicle system 1 is also an optional element.

<Overview of In-Vehicle System 1>

Figure 2:
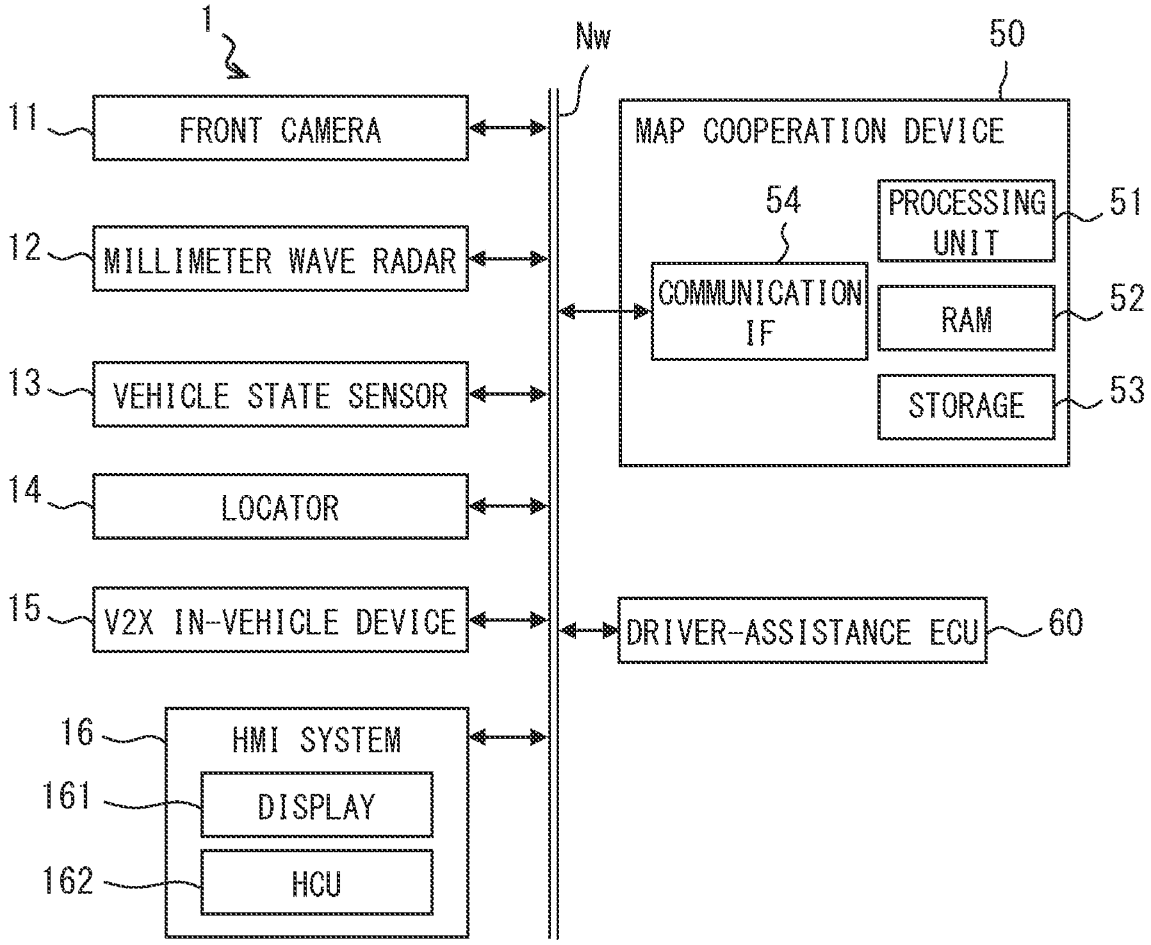
FIG. 2 is a block diagram illustrating the configuration of the in-vehicle system.

As illustrated in FIG. 2, the in-vehicle system 1 includes a front camera 11, a millimeter wave radar 12, a vehicle state sensor 13, a locator 14, a V2X in-vehicle device 15, an HMI system 16, a map cooperation device 50, and a driver-assistance ECU 60. The ECU in a member name is an abbreviation for an electronic control unit, and means an electronic control device. The HMI is an abbreviation for a human machine interface. The V2X is an abbreviation for vehicle to X (everything), and indicates a communication technology for connecting various things to a vehicle.

Various devices or sensors forming the in-vehicle system 1 are connected as nodes to an in-vehicle network Nw serving as a communication network built inside the vehicle. The nodes connected to the in-vehicle network Nw can communicate with each other. Specific devices may be configured to be capable of directly communicating with each other without using the in-vehicle network Nw. For example, the map cooperation device 50 and the driver-assistance ECU 60 may be directly and electrically connected to each other by using a dedicated line. Although the in-vehicle network Nw is configured to be a bus type in FIG. 2, the configuration is not limited thereto. The network topology may be a mesh type, a star type, or a ring type. A network shape can be changed as appropriate. For example, various standards such as the controller area network (hereinafter, CAN: registered trademark), the Ethernet (Ethernet is a registered trademark), and FlexRay (registered trademark) can be adopted as standards of the in-vehicle network Nw.

Hereinafter, a driver's seat occupant who is an occupant seated in a driver's seat of the subject vehicle will also referred to as a user. In the following description, each of front-rear, left-right, and up-down directions is defined with reference to the subject vehicle. Specifically, the front-rear direction corresponds to a longitudinal direction of the subject vehicle. The left-right direction corresponds to a width direction of the subject vehicle. The up-down direction corresponds to a vehicle height direction. From another viewpoint, the up-down direction corresponds to a direction perpendicular to a plane parallel to a plane defined by the front-rear direction and the left-right direction.

<Regarding Configuration Elements of In-Vehicle System 1>

The front camera 11 is a camera that captures a forward image of the vehicle with a predetermined angle of view. The front camera 11 is disposed, for example, in an upper end portion of a front windshield on a vehicle interior side, a front grille, or a roof top. The front camera 11 includes a camera body portion that generates an image frame, and an ECU that detects a predetermined detection target object by performing recognition processing on the image frame. The camera body portion includes at least an image sensor and a lens, and generates and outputs captured image data at a predetermined frame rate (for example, 60 fps). The camera ECU is configured to include an image processing chip, as a main part, including a CPU and a GPU, and includes an identification device as a functional block. For example, the identification device identifies a type of an object, based on a feature amount vector of an image.

The front camera 11 detects a predetermined detection target object, and specifies a relative position of the detection object with respect to the subject vehicle. For example, the detection target object includes a pedestrian, other vehicles, a feature as a landmark, roadside, and a road surface mark. Other vehicles include a bicycle, a motorized bicycle, and a motorcycle. The landmark is a three-dimensional structure installed along a road. For example, a structure installed along the roads includes a guard rail, a curb, a tree, a utility pole, a road sign, and a traffic light. The road sign includes a guide sign such as a direction sign and a road name sign. The feature as the landmark is used for a localization process (to be described later). The road surface mark indicates a paint drawn on a road surface for traffic control and traffic regulation. For example, the road surface mark includes a lane mark indicating a lane boundary, a pedestrian crossing, a stop line, a zebra zone, a safety zone, and a regulation arrow. The lane mark includes those realized by a road tack such as a chatter bar and Botts' Dots, in addition to a paint formed in a dashed line shape or in a continuous line shape by using a yellow or white paint. The lane mark is also called a lane mark or lane marker.

The front camera 11 detects an obstacle such as a dead animal, a fallen tree, and a fallen object. The obstacle here indicates a three-dimensional object that exists on the road and obstructs vehicle traffic. The obstacle includes a tire, an accident vehicle, a fragment of the accident vehicle, in addition to a box, a ladder, a bag, and a ski plate as fallen objects from a traveling vehicle. For example, the obstacle can also include a regulation material and equipment for lane regulations such as an arrow board, a cone, and a guide board, a construction site, a parked vehicle, and an end of a traffic congestion. The obstacle can include a semi-static map element in addition to a stationary object that obstructs vehicle traffic. For example, through image recognition, the front camera 11 identifies and outputs a type of the obstacle such as a fallen object. The output data may include a probability value of correct indicating a likelihood of an identification result. The probability value of correct corresponds to a score that indicates a matching degree of feature amounts in one aspect. It is preferable that the front camera 11 is configured to be capable of detecting not only the subject vehicle traveling lane, but also the obstacle existing in a region corresponding to an adjacent lane. Here, as an example, the front camera 11 is configured to be capable of detecting the obstacle in a subject vehicle traveling lane and the obstacle on right and left adjacent lanes.

An image processor provided in the front camera 11 separates and extracts a background and a detection target object from a captured image, based on image information including a color, luminance, and contrast related to the color and the luminance. For example, based on the image, the front camera 11 calculates a relative distance and direction (that is, a relative position) of the detection target object, such as a lane boundary, a roadside, and the obstacle, from the subject vehicle and a travel speed by using a structure from motion (SfM) process. The relative position of the detection object with respect to the subject vehicle may be specified, based on a size and a degree of inclination of the detection object inside the image. Detection result data indicating the position or the type of the detection object is sequentially provided to the map cooperation device 50 and the driver-assistance ECU 60.

The millimeter wave radar 12 is a device that detects a relative position and a relative speed of the object with respect to the subject vehicle by transmitting millimeter waves or quasi-millimeter waves forward of the vehicle, and analyzing received data of the reflected waves returned after reflecting the transmission waves from the object. For example, the millimeter wave radar 12 is installed in a front grille or a front bumper. The millimeter wave radar 12 incorporates a radar ECU that identifies a type of the detection object, based on a size, a travel speed, and reception strength of the detection object. As a detection result, the radar ECU outputs data indicating the type, the relative position (direction and distance), and the reception strength of the detection object to the map cooperation device 50. The millimeter wave radar 12 is configured to be capable of detecting a part or all of the obstacles described above. For example, the millimeter wave radar 12 determines a state of the obstacle, based on the position, the travel speed, the size, and reflection intensity of the detection object. For example, the type of the obstacle, such as whether the obstacle is a vehicle or a signboard, can be roughly specified, based on the size of the detection object or the reception strength of the reflected waves.

For example, in addition to data indicating a recognition result, the front camera 11 and the millimeter wave radar 12 are configured to provide observation data used for object recognition such as image data to the driver-assistance ECU 60 via the in-vehicle network Nw. For example, the observation data for the front camera 11 indicates an image frame. The observation data of the millimeter wave radar indicates data indicating the reception strength and the relative speed for each detection direction and distance, or data indicating the relative position and the reception strength of the detection object. The observation data corresponds to unprocessed data observed by the sensor or data before recognition processing is performed. Both the front camera 11 and the millimeter wave radar 12 correspond to sensors that sense an outside of the vehicle. Therefore, when the front camera 11 and the millimeter wave radar 12 are the same, both of the front camera 11 and the millimeter wave radar 12 will also be referred to as surrounding monitoring sensors.

Object recognition processing based on the observation data generated by the surrounding monitoring sensor may be executed by an ECU other than the sensor, such as the driver-assistance ECU 60. A part of functions of the front camera 11 and the millimeter wave radar 12 may be provided in the driver-assistance ECU 60. In this case, the camera as the front camera 11 and the millimeter wave radar may provide the driver-assistance ECU 60 with the observation data such as image data and distance measurement data as detection result data.

The vehicle state sensor 13 is a sensor that detects a physical state amount related to traveling control of the subject vehicle. For example, the vehicle state sensor 13 includes an inertial sensor such as a three-axis gyro sensor and a three-axis acceleration sensor. The three-axis acceleration sensor is a sensor that detects acceleration acting on the subject vehicle in the front-rear, left-right, and up-down directions. The gyro sensor detects a rotation angular velocity around a detection axis, and the three-axis gyro sensor has three detection axes orthogonal to each other. The vehicle state sensor 13 can also include a shift position sensor, a steering angle sensor, and a vehicle speed sensor. The shift position sensor is a sensor that detects a position of a shift lever. The steering angle sensor is a sensor that detects a rotation angle of a steering wheel (so-called steering angle). The vehicle speed sensor is a sensor that detects a traveling speed of the subject vehicle.

The vehicle state sensor 13 outputs data indicating a current value (that is, a detection result) of a detection target item to the in-vehicle network Nw. The output data of each vehicle state sensor 13 is acquired by the map cooperation device 50 via the in-vehicle network Nw. The types of sensors used by the in-vehicle system 1 as the vehicle state sensor 13 may be appropriately designed, and it is not necessary to provide all of the above-described sensors.

Figure 3:
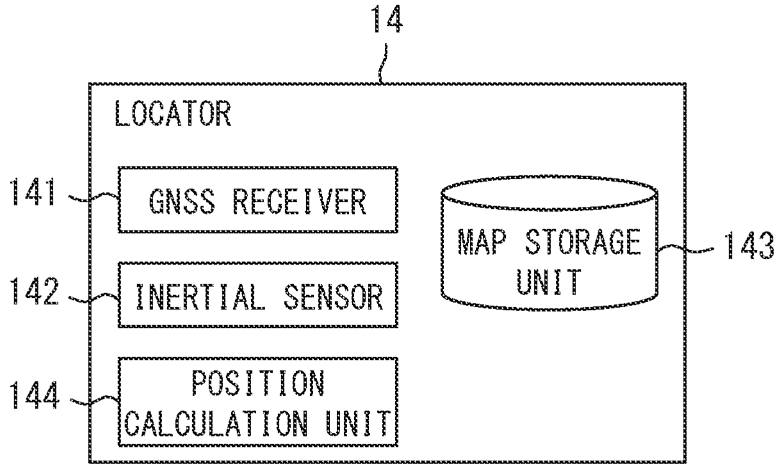
FIG. 3 is a block diagram illustrating a configuration of a locator.

The locator 14 is a device that generates highly accurate position information of the subject vehicle through complex positioning for combining multiple information. For example, as illustrated in FIG. 3, the locator 14 is realized by using a GNSS receiver 141, an inertial sensor 142, a map storage unit 143, and a position calculation unit 144.

The GNSS receiver 141 is a device that sequentially detects current positions of the GNSS receiver 141 by receiving navigation signals transmitted from positioning satellites forming a global navigation satellite system (GNSS). For example, when the GNSS receiver 141 receives the navigation signals from four or more positioning satellites, the GNSS receiver 141 outputs positioning results every 100 milliseconds. As the GNSS, the GPS, the GLONASS, the Galileo, the IRNSS, the QZSS, or the Beidou can be adopted. For example, the inertial sensor 142 is the three-axis gyro sensor and the three-axis acceleration sensor.

The map storage unit 143 is a non-volatile memory that stores high accuracy map data. The high accuracy map data here corresponds to map data indicating a road structure, and a position coordinate regarding the feature installed along the road with accuracy that can be used for autonomous driving. For example, the high accuracy map data includes three-dimensional shape data of the road, lane data, or feature data. The three-dimensional shape data of the road described above includes node data related to a point (hereinafter, referred to as node) at which multiple roads intersect, merge, or branch, and link data related to the road (hereinafter, referred to as a link) connecting the points. The link data may include data indicating a road type such as whether the road is a motorway or a general road. The motorway here indicates a road on which entrance of a pedestrian or a bicycle is prohibited, and indicates a toll road such as an expressway. The road type may include attribute information indicating whether autonomous traveling is allowed on the road. The lane data indicates the number of lanes, installation position coordinates of the lane mark, a traveling direction for each lane, and a branching/merging point in a lane level. The feature data includes position and type information of the road surface display such as a stop line, or position, shape, and type information of the landmark. The landmark includes a three-dimensional structure installed along the road, such as a traffic sign, a traffic light, a pole, and a commercial signboard.

The position calculation unit 144 sequentially performs positioning on the subject vehicle by combining a positioning result of the GNSS receiver 141 and a measurement result of the inertial sensor 142. For example, when the GNSS receiver 141 cannot receive a GNSS signal inside a tunnel, the position calculation unit 144 performs dead reckoning (autonomous navigation) by using a yaw rate and a vehicle speed. The yaw rate used for the dead reckoning may be calculated by the front camera 11 by using the SfM technique, or may be detected by a yaw rate sensor. The vehicle position information obtained by positioning is output to the in-vehicle network Nw, and is used by the map cooperation device 50. The position calculation unit 144 specifies the ID of the subject vehicle traveling lane (hereinafter, referred to as a traveling lane) on the road, based on the subject vehicle position coordinates specified by the above-described configuration.

The locator 14 may be configured to be capable of perform a localization process. The localization process indicates a process for specifying a detailed position of the subject vehicle by collating the coordinates of the landmark specified based on the image captured by the front camera 11 with the coordinates of the landmark registered in the high accuracy map data. The localization process may be performed by collating three-dimensional detection point cloud data output by a light detection and ranging/laser Imaging detection and ranging (LiDAR) with three-dimensional map data. The locator 14 may be configured to specify the traveling lane, based on a distance from the roadside detected by the front camera 11 or the millimeter wave radar 12. Some or all of functions provided to the locator 14 may be provided to the map cooperation device 50 or the driver-assistance ECU 60.

The V2X in-vehicle device 15 is a device for the subject vehicle to perform wireless communication with other devices. The "V" of V2X indicates an automobile serving as the subject vehicle, and the "X" indicates various presences other than the subject vehicle, such as the pedestrian, other vehicles, a road facility, the network, or the server. The V2X in-vehicle device 15 includes a wide area communication unit and a short range communication unit as communication modules. The wide area communication unit is a communication module for performing wireless communication conforming to a predetermined wide area wireless communication standard. For example, various standards such as Long Term Evolution (LTE), 4G, and 5G can be adopted as the wide area wireless communication standard here. In addition to communication via a wireless base station, the wide area communication unit may be configured to be capable of performing wireless communication directly with other devices, in other words, without using the base station, by a method conforming to the wide area wireless communication standard. That is, the wide area communication unit may be configured to execute cellular V2X. Since the V2X in-vehicle device 15 is mounted, the subject vehicle functions as a connected car that can be connected to the Internet. For example, the map cooperation device 50 can download latest high accuracy map data from the map server 2, and can update the map data stored in the map storage unit 143 in cooperation with the V2X in-vehicle device 15.

The short range communication unit provided in the V2X in-vehicle device 15 is a communication module for directly performing wireless communication with other moving objects or roadside devices existing around the subject vehicle in accordance with a communication standard in which a communication distance is limited within several hundred meters (hereinafter, referred to as a short range communication standard). The other moving objects are not limited to the vehicle, and may include the pedestrian or the bicycle. Any optional standard such as the wireless access in vehicular environment (WAVE) standard disclosed in IEEE 1709 or the dedicated short range communications (DSRC) standard can be used as the short range communication standard. For example, the short range communication unit broadcasts vehicle information on the subject vehicle to surrounding vehicles at a predetermined transmission cycle, and receives the vehicle information transmitted from other vehicles. The vehicle information includes a vehicle ID, a current position, a traveling direction, a travel speed, an operation state of a direction indicator, and a time stamp.

The HMI system 16 is a system that provides an input interface function for accepting a user operation and an output interface function for presenting information to the user. The HMI system 16 includes a display 161 and an HMI control unit (HCU) 162. In addition to the display 161, a speaker, a vibrator, or an illumination device (for example, an LED) can be adopted as means for presenting the information to the user.

The display 161 is a device that displays an image. For example, the display 161 is a center display provided in an uppermost portion of a central part (hereinafter, referred to as a central region) of the instrument panel in the vehicle width direction. The display 161 can perform a full-color display, and can be realized by using a liquid crystal display, an organic light emitting diode (OLED) display, or a plasma display. As the display 161, the HMI system 16 may include a head-up display that projects a virtual image on a portion of the front windshield in front of the driver's seat. The display 161 may be a meter display.

The HCU 162 is configured to comprehensively control information presentation to the user. The HCU 162 is realized by using a processor such as a CPU and a GPU, a RAM, or a flash memory. The HCU 162 controls a display screen of the display 161, based on information provided from the map cooperation device 50 or a signal from an input device (not illustrated). For example, the HCU 162 displays an obstacle notification image 80 illustrated in FIG. 4 on the display 161, based on a demand from the map cooperation device 50 or the driver-assistance ECU 60.

Figure 4:
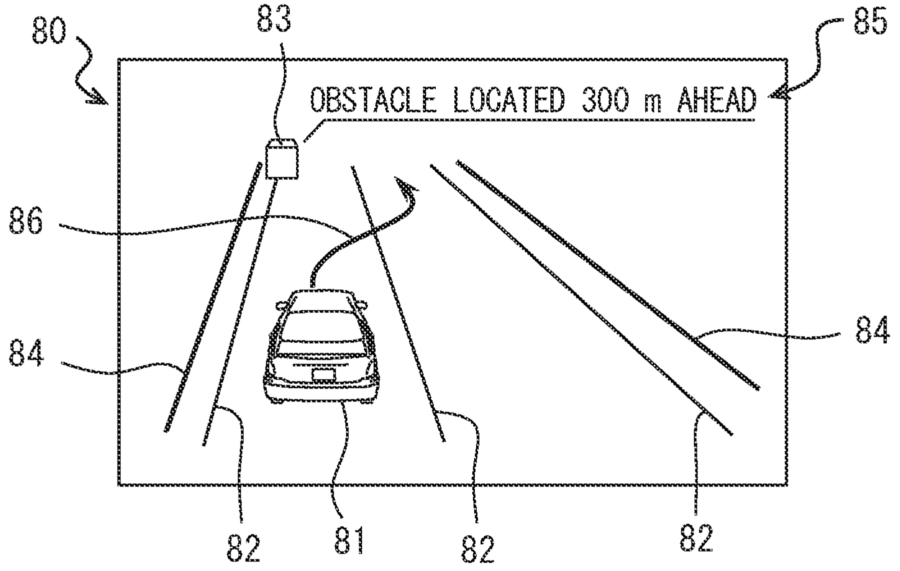
FIG. 4 is a figure illustrating an example of an obstacle notification image.

The obstacle notification image 80 is an image for notifying the user of information on the obstacle. For example, the obstacle notification image 80 includes information on a positional relationship between the lane on which the obstacle exists and the subject vehicle traveling lane. FIG. 4 illustrates a case where the obstacle exists on the subject vehicle traveling lane. An image 81 in FIG. 4 indicates the subject vehicle, and an image 82 indicates the lane boundary. An image 83 indicates the obstacle, and an image 84 represents the roadside. The obstacle notification image 80 may include an image 85 indicating a remaining distance to a point where the obstacle exists. The obstacle notification image 80 may include an image 86 indicating whether a lane change is required. FIG. 4 illustrates a case where the subject vehicle is guided to change lanes since the obstacle such as the street parking vehicle exists on the subject vehicle traveling lane. The obstacle notification image 80 indicating the position of the obstacle may be displayed on the head-up display to overlap a real world viewed from the driver's seat occupant. It is preferable that the obstacle notification image 80 includes information indicating the type of the obstacle.

The map cooperation device 50 is a device that acquires map data including the obstacle information from the map server 2 and uploads information on the obstacle detected by the subject vehicle to the map server 2. Details of functions of the map cooperation device 50 will be separately described later. The map cooperation device 50 is configured to mainly include a computer including a processing unit 51, a RAM 52, a storage 53, a communication interface 54, and a bus connecting these. The processing unit 51 is hardware for calculation processing coupled with the RAM 52. The processing unit 51 has a configuration including at least one arithmetic core such as a central processing unit (CPU). The processing unit 51 accesses the RAM 52 to perform various processes for determining the existence/disappearance of the obstacle. The storage 53 is configured to include a non-volatile storage medium such as flash memory. The storage 53 stores an obstacle report program which is a program executed by the processing unit 51. Executing the obstacle report program in the processing unit 51 corresponds to executing a method corresponding to the obstacle report program. The communication interface 54 is a circuit for communicating with other devices via the in-vehicle network Nw. The communication interface 54 may be realized by using an analog circuit element or an IC.

For example, the map cooperation device 50 may be included in a navigation device. The map cooperation device 50 may be included in the driver-assistance ECU 60 or the autonomous driving ECU. The map cooperation device 50 may be included in the V2X in-vehicle device 15. The functional disposition of the map cooperation device 50 can be changed as appropriate. The map cooperation device 50 corresponds to the vehicle device.

The driver-assistance ECU 60 is an ECU that assists a driving operation of the driver's seat occupant, based on the detection results of the surrounding monitoring sensors such as the front camera 11 and the millimeter wave radar 12 or the map information acquired by the map cooperation device 50. For example, the driver-assistance ECU 60 presents driver-assistance information such as an obstacle notification image indicating the position of the obstacle. The driver-assistance ECU 60 controls traveling actuators which are traveling actuators, based on the detection result of the surrounding monitoring sensor and the map information acquired by the map cooperation device 50, thereby performing a part or all of the driving operation, on behalf of the driver's seat occupant. For example, the traveling actuator includes a brake actuator (braking device), an electronic throttle, and a steering actuator.

As one of vehicle control functions, the driver-assistance ECU 60 provides a function of automatically changing lanes (hereinafter, referred to as an autonomous lane change function). For example, when the vehicle reaches a scheduled lane change point on a separately generated traveling plan, the driver-assistance ECU 60 cooperates with the HMI system 16 to transmit an enquiry as to whether to change lanes to the driver's seat occupant. When it is determined that the input device is operated by the driver's seat occupant to instruct the lane change, a steering force is generated in a direction toward a target lane in view of a traffic condition of the target lane, and a traveling position of the subject vehicle is changed to the target lane. The scheduled lane change point can be defined as a section having a certain length.

As in the map cooperation device 50, the driver-assistance ECU 60 is configured to mainly include a computer including the processing unit, the RAM, the storage, the communication interface, and the bus connecting all of these. Each element is omitted in the illustration. The storage provided in the driver-assistance ECU 60 stores a driver-assistance program which is a program executed by the processing unit. Executing the driver-assistance program in the processing unit corresponds to executing a method corresponding to the driver-assistance program.

<Regarding Configuration of Map Cooperation Device 50>

Figure 5:
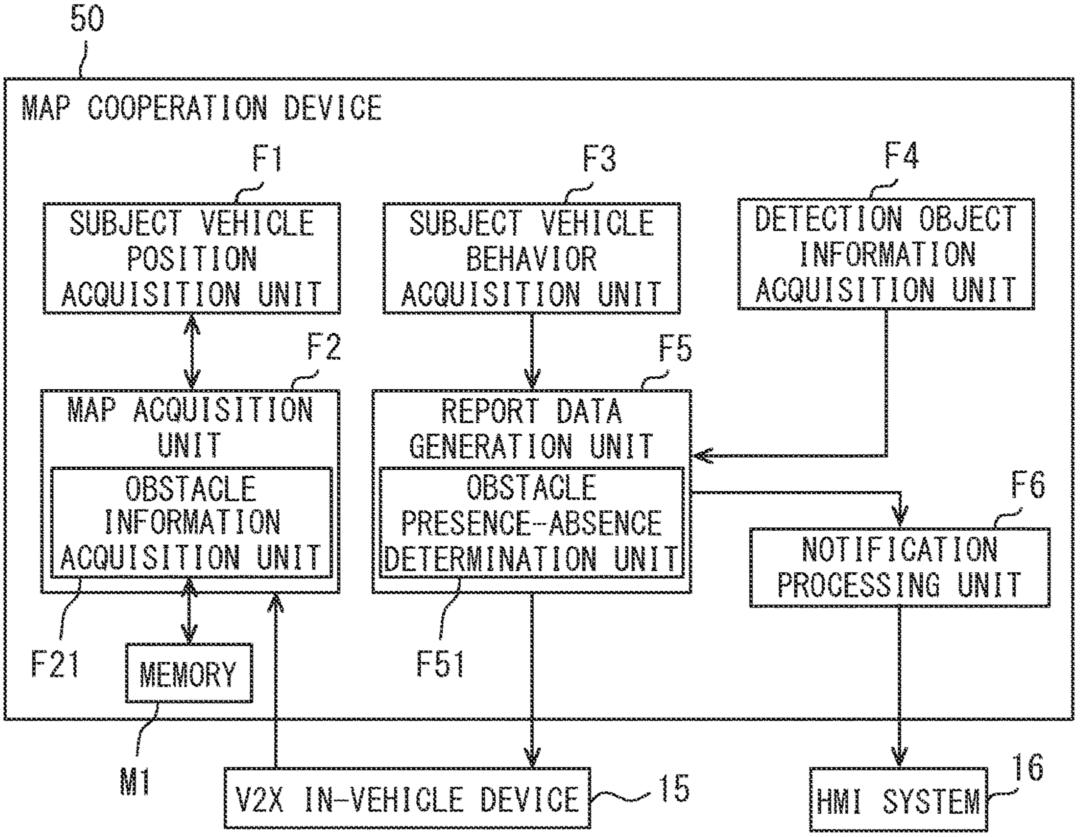
FIG. 5 is a block diagram illustrating a configuration of a map cooperation device.

Here, a function and an operation of the map cooperation device 50 will be described with reference to FIG. 5. The map cooperation device 50 provides functions corresponding to various functional blocks illustrated in FIG. 5 by executing the obstacle report program stored in the storage 53. That is, as the functional blocks, the map cooperation device 50 includes a subject vehicle position acquisition unit F1, a map acquisition unit F2, a subject vehicle behavior acquisition unit F3, a detection object information acquisition unit F4, a report data generation unit F5, and a notification processing unit F6. The map acquisition unit F2 includes an obstacle information acquisition unit F21. The report data generation unit F5 includes an obstacle presence-absence determination unit F51.

The subject vehicle position acquisition unit F1 acquires position information of the subject vehicle from the locator 14. A traveling lane ID is acquired from the locator 14. Some or all of the functions of the locator 14 may be provided in the subject vehicle position acquisition unit F1.

The map acquisition unit F2 reads map data in a predetermined range determined based on the current position from map storage unit 143. The map acquisition unit F2 acquires obstacle information existing within a predetermined distance ahead of the subject vehicle from the map server 2 via the V2X in-vehicle device 15. The obstacle information is data regarding the point where the obstacle exists as will be separately described later, and includes the lane on which the obstacle exists and the type of the obstacle. A configuration for acquiring the obstacle information corresponds to the obstacle information acquisition unit F21 and the obstacle point information acquisition unit.

The obstacle information acquisition unit F21 can acquire the obstacle information corresponding to the current position of the subject vehicle by requesting the map server 2. This distribution aspect is also called pull-based distribution. The map server 2 may automatically distribute the obstacle information to the vehicle existing in the vicinity of the obstacle. This distribution aspect is also called push-based distribution. That is, the obstacle information may be acquired by either the pull-based distribution or the push-based distribution. Here, as an example, a configuration is adopted as follows. The map server 2 selects a vehicle serving as a distribution target, based on the position information of each vehicle, and perform the push-based distribution on the distribution targets.

The obstacle information acquired by the map acquisition unit F2 is temporarily stored in the memory M1 realized by using the RAM 52. The obstacle information stored in the memory M1 may be deleted when the vehicle passes through the point indicated by the data or when a prescribed time elapses. For convenience, the obstacle information acquired from the map server 2 will also be referred to as on-map obstacle information. A point where the obstacle exists, which is indicated by the on-map obstacle information, will also be referred to as an obstacle registration point or simply an obstacle point.

The subject vehicle behavior acquisition unit F3 acquires data indicating the behavior of the subject vehicle from the vehicle state sensor 13. For example, the traveling speed, the yaw rate, lateral acceleration, or vertical acceleration is acquired. The subject vehicle behavior acquisition unit F3 acquires information indicating whether the vehicle travels across the lane boundary, from the front camera 11, and an offset amount in which the traveling position is offset to the right or to the left from a center of the lane. Here, the vertical acceleration corresponds to acceleration in the front-rear direction, and the lateral acceleration corresponds to acceleration in the left-right direction. The subject vehicle behavior acquisition unit F3 corresponds to the vehicle behavior detection unit.

The detection object information acquisition unit F4 acquires information on the obstacle detected by the front camera 11 or the millimeter wave radar 12 (hereinafter, referred to as detection obstacle information). For example, the detection obstacle information includes the position where the obstacle exists, and the type or the size of the obstacle. A point where the obstacle exists which is detected by the surrounding monitoring sensor will also be referred to as an obstacle detection position. The obstacle detection position can be expressed in any optional absolute coordinate system such as World Geodetic System 1984 (WGS84). The obstacle detection position can be calculated by combining current position coordinates of the subject vehicle and relative position information of the obstacle with respect to the subject vehicle detected by the surrounding monitoring sensor. The detection object information acquisition unit F4 can acquire not only recognition results from various surrounding monitoring sensors, but also observation data such as image data captured by the front camera 11. The detection object information acquisition unit F4 can be called an external information acquisition unit.

For example, the obstacle detection position may indicate whether the obstacle exists on any lane. For example, the obstacle detection position may be expressed by a lane ID. It is preferable that the obstacle detection position includes a lateral position of an end portion of the obstacle inside the lane. The lateral position information of the end portion of the obstacle inside the lane can be used as information indicating how much the lane is blocked by the obstacle. While the above-described obstacle registration point indicates the obstacle position recognized by the map server 2, the obstacle detection position indicates the position actually observed by the vehicle.

Various data sequentially acquired by the subject vehicle position acquisition unit F1, the subject vehicle behavior acquisition unit F3, and the detection object information acquisition unit F4 are stored in a memory such as the RAM 52, and are used for the reference by the map acquisition unit F2 and the report data generation unit F5. For example, various types of information are classified according to each type and stored in the memory after a time stamp indicating an acquisition time of the data is assigned. The time stamp has a function of linking different types of information at the same time. Since the time stamp is used, for example, the map cooperation device 50 can specify the vehicle behavior synchronized with a vehicle outside video. The time stamp may be an output time or a generation time of the data in an output source, instead of the acquisition time. When the output time or the generation time is adopted as the time stamp, it is preferable that time information of each in-vehicle device is synchronized. For example, various types of information acquired by the map cooperation device 50 can be sorted and stored to show latest data first. The data in which a prescribed time elapses after acquisition can be discarded.

The report data generation unit F5 is configured to generate a data set to be transmitted to the map server 2 and output the data set to the V2X in-vehicle device 15. The report data generation unit F5 can be called as a report processing unit. For example, the report data generation unit F5 generates the vehicle condition report described first at a predetermined interval, and uploads the vehicle condition report to the map server 2 via the V2X in-vehicle device 15. The report data generation unit F5 generates an obstacle point report, and uploads the obstacle point report to the map server 2, as an upload processing (to be separately described later).

The obstacle presence-absence determination unit F51 is configured to determine whether obstacle exists, based on the detection obstacle information acquired by the detection object information acquisition unit F4 and the subject vehicle behavior data acquired by the subject vehicle behavior acquisition unit F3. For example, the obstacle presence-absence determination unit F51 may determine whether the obstacle exists by sensor fusion between the front camera 11 and the millimeter wave radar 12. For example, when the front camera 11 is able to detect the obstacle i at a point, where the obstacle or a three-dimensional stationary object with unidentified type is detected by the millimeter wave radar 12, it may be determined that the obstacle exists. When the obstacle or the three-dimensional stationary object with unidentified type is not detected by the millimeter wave radar 12 at a point where the obstacle is detected by the front camera 11, it may be determined that the obstacle does not exist. The obstacle presence-absence determination unit F51 may determine whether the obstacle exists by determining whether the subject vehicle has performed a predetermined avoidance action when the obstacle is detected on the subject vehicle traveling lane by at least one of the front camera 11 and the millimeter wave radar 12.

Here, for example, the avoidance action is a vehicle behavior for avoiding the obstacle, and for example, the avoidance action indicates a change in a traveling position. Here, changing the traveling position indicates changing a position in the lateral direction of the vehicle on the road. The change in the traveling position includes not only the lane change, but also moving the traveling position inside the same lane to either a right corner or a left corner, or the form of traveling across the lane boundary. In order to clarify a difference from a normal lane change, it is preferable that the avoidance action is changing/steering of the traveling position accompanied by deceleration and acceleration thereafter. For example, changing the traveling position accompanied by a deceleration operation or changing the traveling position accompanied by deceleration to a predetermined speed or lower can be regarded as the avoidance action. Description on the avoidance action indicates a concept of the avoidance action assumed in the present disclosure. Whether the traveling position is changed as the avoidance action is detected, based on not only a traveling trajectory, but also a change pattern of lateral acceleration, and an operation history of the direction indicator, as will be separately described later.

The obstacle presence-absence determination unit F51 specifies an avoidance direction which is a direction avoided by the vehicle, based on the yaw rate acting on the subject vehicle or a displacement direction of a steering angle. For example, when the traveling position of the subject vehicle is changed to the right side, that is, when the subject vehicle is steered to the right side, the avoidance direction is right. The avoidance direction is inevitably a direction in which the obstacle does not exist. The avoidance direction can be paradoxically an index indicating a direction in which the obstacle exists. The obstacle presence-absence determination unit F51 can also be called an avoidance action determination unit in one aspect.

The notification processing unit F6 is configured to notify the driver's seat occupant of information on the obstacle existing in front of the vehicle in cooperation with the HMI system 16, based on the on-map obstacle information. For example, the notification processing unit F6 generates an obstacle notification image illustrated in FIG. 4, and causes the display 161 to display the obstacle notification image, based on the on-map obstacle information. The driver's seat occupant may be notified of the obstacle by using a voice message. The driver-assistance ECU 60 may include the notification processing unit F6.

<Regarding Upload Processing>

Figure 6:
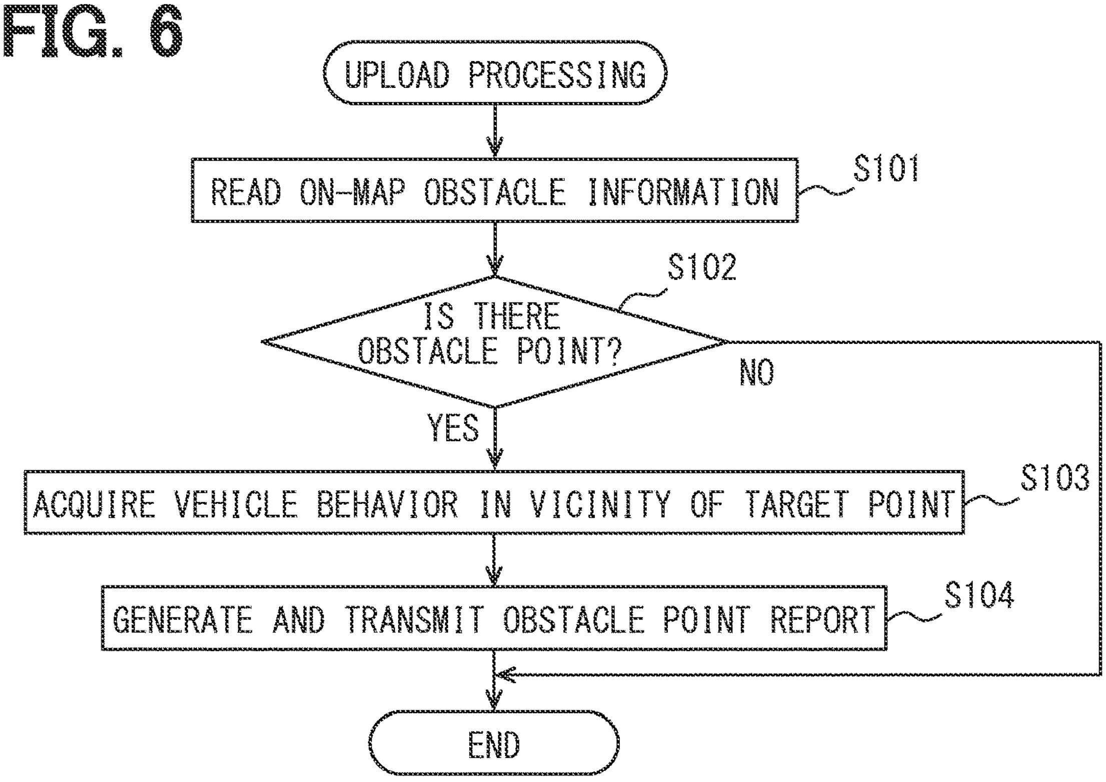
FIG. 6 is a flowchart illustrating an example of an upload processing.

Here, an upload processing performed by the map cooperation device 50 will be described by using a flowchart illustrated in FIG. 6. For example, processes in the flowchart illustrated in FIG. 6 are performed while a traveling power supply for the vehicle is turned on, at predetermined cycles (for example, every 100 milliseconds). The traveling power supply, for example, is a power supply that enables the vehicle to travel, and is an ignition power supply in an engine vehicle. In an electric vehicle, a system main relay corresponds to the traveling power supply. The upload processing includes Steps S101 to S104 as an example.

In Step S101, the report data generation unit F5 reads the on-map obstacle information stored in the memory M1, and the process proceeds to Step S102. Step S101 can be a process for acquiring the obstacle information within the predetermined distance in front of the vehicle from the map server 2.

In Step S102, based on the on-map obstacle information, it is determined whether the obstacle exists within the predetermined distance (hereinafter, referred to as a reference distance) in front of the vehicle. Step S102 corresponds to a process for determining whether an obstacle registration point exists within the reference distance. For example, the reference distance is 200 m or 300 m. It is preferable that the reference distance is longer than a limit value of a distance at which the front camera 11 can recognize the object. The reference distance may be changed depending on the traveling speed of the vehicle. For example, the reference distance may be set to be longer as the traveling speed of the vehicle increases. For example, the distance which the vehicle reaches within a predetermined time such as 30 seconds may be calculated depending on the speed of the subject vehicle, and the calculated distance may be adopted as the reference distance.

When the obstacle recognized by the map server 2 does not exist within the reference distance in Step S102, this flow ends. On the other hand, when the obstacle exists within the reference distance, that is, when the obstacle registration point exists, a process of Step S103 is performed.

In Step S103, the vehicle behavior when the vehicle travels within a predetermined report target distance before and after the obstacle registration point is acquired, and the process proceeds to Step S104. In Step S104, time-series data of the vehicle behavior acquired in Step S103 and a data set including transmission source information and report target point information are generated as an obstacle point report. The report target point information is information indicating whether the obstacle point report relates to any point. For example, position coordinates of the obstacle registration point are set in the report target point information.

Figure 7:
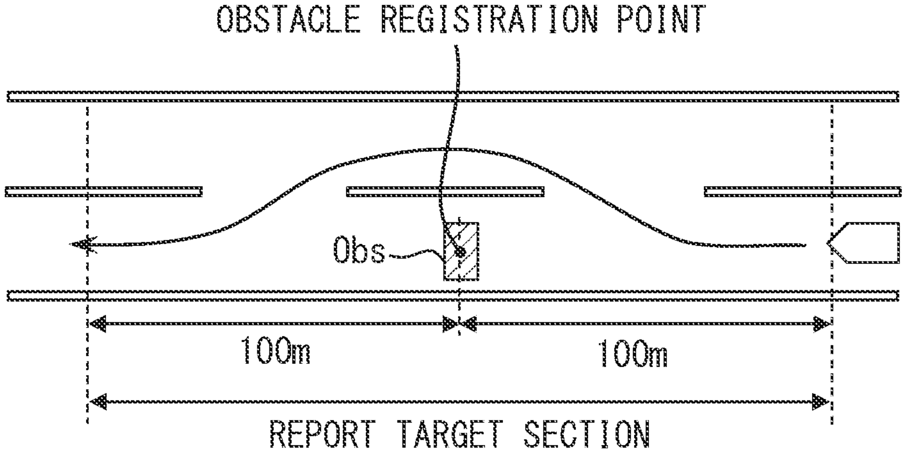
FIG. 7 is a figure describing a range of vehicle behavior data included in an obstacle point report.

It is preferable that the report target distance is set to a distance at which the driver's seat occupant or the surrounding monitoring sensor can recognize a status of the obstacle registration point. For example, the report target distance may be set to 100 m before and after the obstacle registration point as illustrated in FIG. 7. In this case, for example, the obstacle point report is a data set indicating the vehicle behavior within 100 m before and after the obstacle registration point. A section within the report target distance before and after the obstacle registration point will also be referred to as a report target section.

The vehicle behavior data included in the obstacle point report is data indicating whether the vehicle traveling on the lane on which the obstacle exists performs a movement to avoid the obstacle (that is, the avoidance action). For example, as the data indicating the vehicle behavior, vehicle position coordinates, a traveling direction, a traveling speed, vertical acceleration, lateral acceleration, and a yaw rate at each time point when the vehicle passes through the vicinity of the obstacle registration point can be adopted. For example, the vicinity of the obstacle registration point indicates a range within 20 m of the obstacle registration point. The range within 50 m or 100 m before and after the obstacle registration point may be regarded as the vicinity of the obstacle registration point. The range considered as the vicinity of the obstacle registration point may be changed depending on a road type or a legal upper speed limit. The above-described report target distance is determined according depending on which range is considered as the vicinity of the obstacle registration point. The data indicating the vehicle behavior can include a steering angle, a shift position, an operation state of a direction indicator, a lighting state of a hazard flasher, whether the vehicle has crossed the lane boundary, whether a lane change is performed, and an offset amount from the lane center.

It is preferable that the obstacle point report includes a traveling lane ID at each time point when the vehicle passes through the vicinity of the obstacle registration point. The reason is shown as following. Since the traveling lane ID is provided, the map server 2 can determine whether the report is transmitted from the vehicle traveling on the lane on which the obstacle exists. As a matter of course, the map server 2 may determine whether the report is transmitted from the vehicle traveling on the lane on which the obstacle exists, based on time-series data of position coordinates included in the obstacle point report.

It is preferable that the obstacle point report includes not only the vehicle behavior up to the obstacle registration point but also the vehicle behavior information after the vehicle passes through the obstacle registration point. The reason is shown as below. When a lane change or steering of a certain vehicle is performed to avoid an obstacle, there is a high possibility that a movement for returning to an original lane may be performed after the vehicle passes through the obstacle. That is, since the vehicle behavior after the vehicle passes through the obstacle registration point is included in the obstacle point report, determination accuracy can be improved by determining whether the movement is performed to avoid the obstacle by the vehicle, and whether the obstacle really exists.

For example, the obstacle point report can be data indicating a vehicle condition in every 100 milliseconds while the vehicle travels in the report target section. A sampling interval of the vehicle behavior is not limited to 100 milliseconds, and may be 200 milliseconds. As the sampling interval becomes shorter, a data size increases. Therefore, in order to reduce the amount of communication, it is preferable to set the sampling interval to be long enough to analyze the movement of the vehicle.

When the report target distance is extremely short, for example, only the data after performing the avoidance action is collected in the map server 2, it is unclear whether the avoidance action is performed. On the other hand, when the report target distance is set to be too long, the data indicating the avoidance action is less likely to be omitted, but the data size increases. It is preferable that the report target distance is set to include a point where the avoidance action is assumed to be performed in order to avoid the obstacle. For example, it is preferable that the report target distance is set to 25 m or longer.

The length of the report target distance may be changed depending on whether the road is a general road or a motorway. The motorway is a road on which entrance of a pedestrian or a bicycle is prohibited, and includes a toll road such as an expressway. For example, the report target distance in the general road may be set to be shorter than the report target distance in the motorway. Specifically, whereas the report target distance for the motorway may be set to 100 m or longer, the report target distance for the general road may be set to 50 m or shorter, such as 30 m. The reason is shown as below. The motorway has better forward visibility than the general road, and there is a possibility that the avoidance action may be performed from a point away from a point where the obstacle exists.

The sampling interval may be changed depending on the road type, such as whether the road is the motorway or the general road. The sampling interval for the motorway may be shorter than the sampling interval for the general road. The data size can be reduced by lengthening the sampling interval. Alternatively, as the report target distance is getting longer, a configuration to have a sparse sampling interval is more likely to be adopted. According to this configuration, the data size of the obstacle point report can fall within a prescribed range.

The report target distance or the sampling interval may be dynamically determined by an instruction signal from the map server 2. Information types (in other words, items) included in the obstacle point report may be dynamically determined by the instruction signal from the map server 2.

The report target distance, the sampling interval, and the items included in the obstacle point report may be changed depending on a type or a size of the obstacle and a blocked degree of the lane. For example, in a case where the lane change is essential as the avoidance action, such as when the obstacle blocks more than half of the lane, the obstacle point report may be limited to information for determining whether the report vehicle has changed lanes. Whether a lane change has been performed can be determined, based on a traveling trajectory and whether the traveling lane ID has changed.

The obstacle point report may include detection result information indicating whether the obstacle is detected by the surrounding monitoring sensor. The obstacle detection result may indicate a detection result of each of the front camera 11 and the millimeter wave radar 12, or may be a determination result of the obstacle presence-absence determination unit F51. When the obstacle is detected by the surrounding monitoring sensor, the obstacle point report may include the detection obstacle information acquired by the detection object information acquisition unit F4. For example, the obstacle point report may include image data captured by the front camera 11 at a predetermined distance (for example, 10 m before) from the obstacle registration point.

Figure 8:
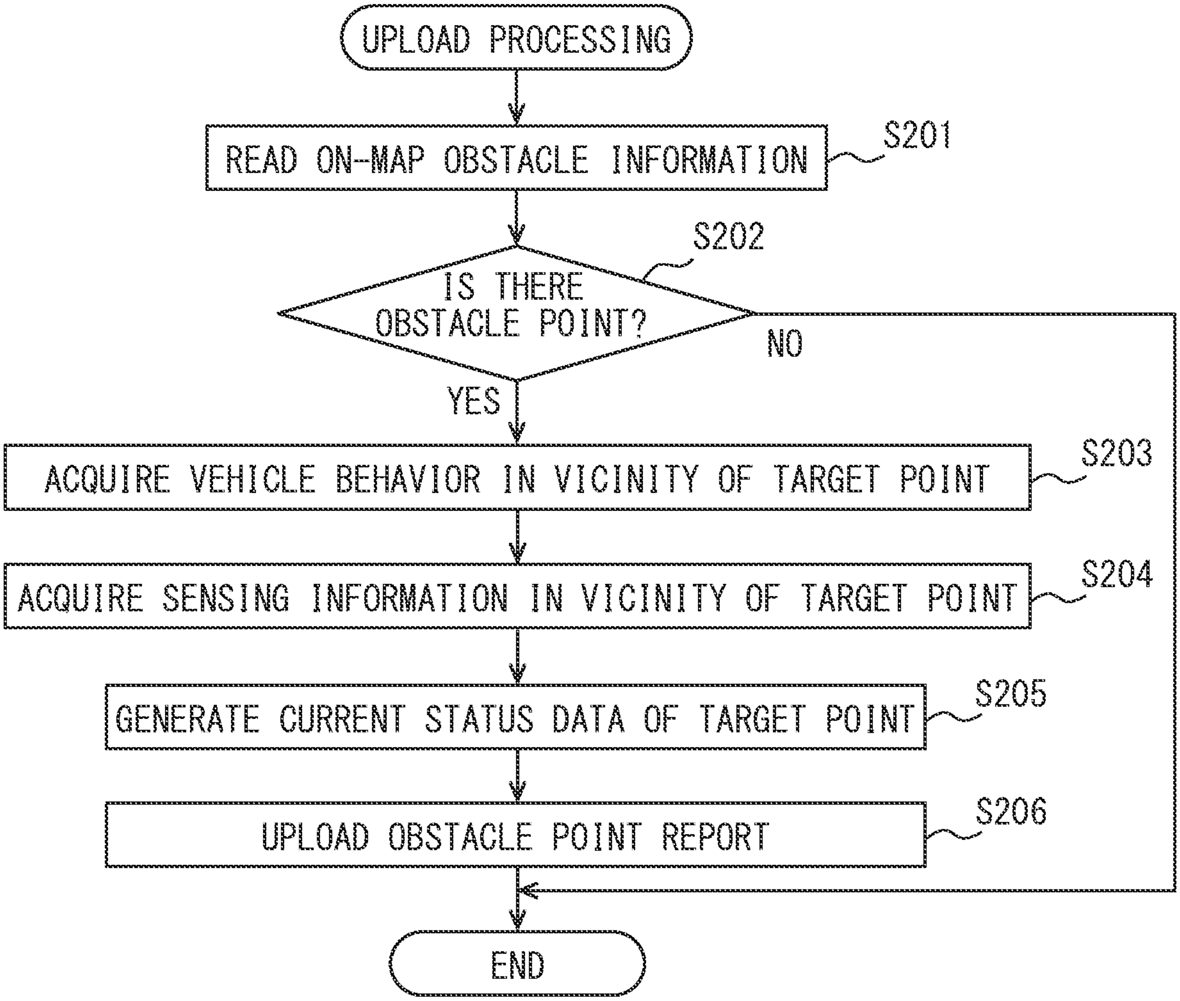
FIG. 8 is a flowchart illustrating an example of an upload processing.

An aspect of the upload processing is not limited to the contents described above. For example, the upload processing may be configured to include Steps S201 to S206 as illustrated in FIG. 8. Steps S201 to S203 illustrated in FIG. 8 are the same as Steps S101 to S101 described above. When Step S203 is completed, Step S204 is performed.

In Step S204, the detection object information acquisition unit F4 acquires sensing information from at least one of the front camera 11 and the millimeter wave radar 12 when the vehicle passes through the vicinity of the obstacle registration point. The sensing information here includes observation data in addition to a recognition result based on the observation data. Here, as an example, the recognition result related to the obstacle (that is, detection obstacle information) of the front camera 11 and the millimeter wave radar 12 and the captured image of the front camera 11 are acquired. For example, as in the vehicle behavior information, a collection period of the sensing information can be a period until the obstacle registration point is located behind the report target distance after the vehicle passes through a point where a remaining distance to the obstacle registration point is equal to or shorter than the report target distance. When the vehicle does not include the surrounding monitoring sensor whose detection range behind the vehicle, the collection period of the sensing information may be a period until the vehicle passes through the obstacle registration point after the remaining distance to the obstacle registration point is equal to or shorter than the report target distance. When Step S204 is completed, Step S205 is performed.

In Step S205, based on the sensing information collected in Step S204, current status data indicating a current status of the obstacle registration point is generated. For example, the current status data includes the recognition result of the surrounding monitoring sensor in every 250 milliseconds during the collection period of the sensing information. When the obstacle is detected by the front camera 11 within the period, the current status data includes at least one frame of image data for detecting the obstacle. Since the current status data includes at least one image frame in which the obstacle registration point is shifted, analytic performance of the map server 2 can be improved.

The image frames included in the current status data may be all frames captured during the collection period of the sensing information, or may be image frames captured at an interval of 200 milliseconds. As the number of image frames included in the current status data increases, the analytic performance of the map server 2 is improved, whereas the amount of communication also increases. The amount of the image frames included in the current status data may be selected to have the amount of data which is equal to or smaller than a predetermined upper limit value. Instead of all of the image frames, only an image region to which the obstacle is imaged may be extracted and included in the current status data.

When Step S205 is completed, Step S206 is performed. In Step S206, a data set including data indicating the vehicle behavior acquired in Step S203 and the current status data generated in Step S205 is generated as the obstacle point report, and is uploaded to the map server 2.

According to the above-described configuration, the map server 2 can collect not only the vehicle behavior, but also the recognition result of the surrounding monitoring sensor or the image data. As a result, it is possible to more accurately verify whether the obstacle still exists or has disappeared. The vehicle traveling on an adjacent lane, which is the vehicle traveling on a lane adjacent to the lane on which the obstacle exists, does not perform the avoidance action due to the existence of the obstacle. However, the obstacle can be observed by the front camera 11 or the millimeter wave radar 12 of the vehicle. That is, a state of the lane on which the obstacle exists (hereinafter, referred to as an obstacle lane) can also be observed by the vehicle traveling on the adjacent lane. According to the above-described configuration, the map server 2 can also collect the sensing information of the surrounding monitoring sensor of the vehicle traveling on the adjacent lane. Therefore, it is possible to more accurately verify whether the obstacle exists.

The present publication is not limited to the upload processing that uploads the obstacle point report when the vehicle travels in the vicinity of the obstacle registration point in front of the subject vehicle. The map cooperation device 50 may be configured to upload the obstacle point report, even when the obstacle registration point does not exist, for example, when the vehicle behavior or the sensing information indicating the existence of the obstacle is obtained.

Figure 9:
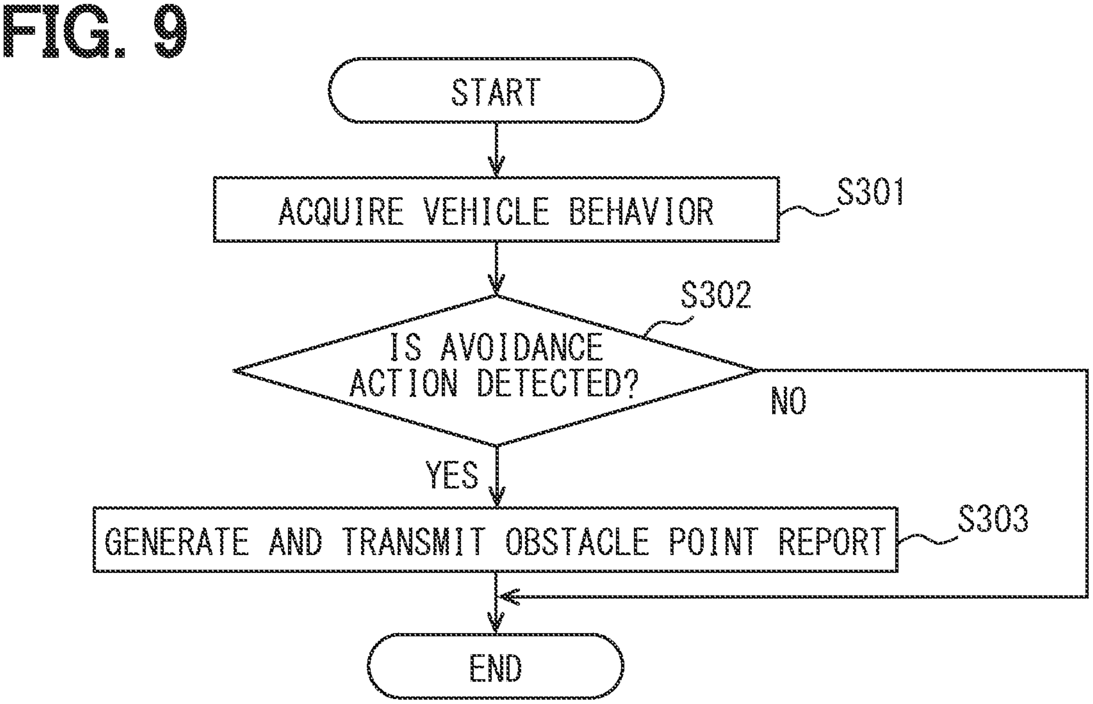
FIG. 9 is a flowchart illustrating an operation example of the map cooperation device.

For example, as illustrated in FIG. 9, the map cooperation device 50 may be configured to perform the processes including Steps S301 to S303. For example, the process illustrated in FIG. 9 is performed independently of the upload processing at a predetermined performance interval. For example, the process flow illustrated in FIG. 9 may be performed when the upload processing determines that the obstacle registration point does not exist (Step S102 or Step S202: NO).

In Step S301, the vehicle behavior data for a latest predetermined time (for example, 10 seconds) is acquired, and Step S302 is performed. In Step S302, the vehicle behavior data acquired in Step S301 is analyzed to determine whether the avoidance action is performed. For example, it is determined that the avoidance action is performed when the traveling position accompanied with deceleration or stopping is changed, or when sudden steering is performed. Whether the traveling position has changed may be determined, based on the trajectory of the subject vehicle position, or can be determined, based on the yaw rate, the steering angle, the time-dependent change in the lateral acceleration, or the lighting state of the direction indicator. Whether the traveling position has changed may be determined, based on whether the vehicle has crossed the lane boundary. Whether the avoidance action has been performed, based on a fact that the yaw rate, the steering angle, or the lateral acceleration is equal to or greater than a predetermined value.

When it is determined that the avoidance action has been performed in Step S302, the process proceeds to Step S303, and the obstacle point report is generated and transmitted in the same manner as that in Steps S103 and S206 described above. The obstacle point report uploaded in Step S303 may include the image frames captured within a predetermined time after the avoidance action. Hereinafter, the image data transmitted to the map server 2 when the avoidance action is performed as a trigger will be referred to as a report image. The report image corresponds to an image for the map server 2 to specify the obstacle avoided by the vehicle and to verify whether the obstacle really exists. The obstacle point report transmitted in Step S303 corresponds to data indicating the existence of the obstacle which is not yet recognized by the map server 2. The report point information of the obstacle point report generated in Step S303 should be set as the vehicle position immediately before determining the avoidance action has been performed. Since the vehicle position before the avoidance action has been performed is set, it is possible to reduce a risk of misspecifying the lane on which the obstacle exists. A point located on a side in the traveling direction at a predetermined distance (for example, 20 m) from the vehicle position before the avoidance action is performed may be set as the report point.

With regard to the uploading of the report image, as the report image, in the image captured at a time of sudden steering or sudden braking or a time immediately thereafter, the map cooperation device 50 may transmit a cutoff of a predetermined range from a predetermined reference point on an opposite side in a steering direction in the image. More specifically, when the avoidance direction is to the right side, as the report image, the report data generation unit F5 may transmit the partial image located on the left side from the reference point. The reference point may be a dynamically determined disappearing point, or may be a center point of a preset image. The reference point may be a point located on an upper side by a predetermined amount from the center point of the image. The disappearing point can be calculated by using a technique such as an optical flow. A verification area as described later can be adopted as a range for the cutout as the report image. According to the above-described configuration, even when the map cooperation device 50 cannot specify the obstacle on a real-time basis, the map server 2 can specify the obstacle that causes the avoidance action. Based on the configuration in which only a portion of the captured image data is transmitted, the amount of data to be uploaded to the map server 2 can be reduced.

With regard to the above-described configuration, in the image captured at the time point at the time of sudden steering or sudden braking or immediately thereafter, the report data generation unit F5 may transmit a cutout of the image of the obstacle as the report image, on the opposite side in the avoidance direction from the reference point. Instead of the cutout, a partial image in which a three-dimensional object is detected by the millimeter wave radar 12 may be extracted and transmitted as the report image.

For example, when recognition of the end of the traffic congestion is delayed and the avoidance action is performed on sudden braking or sudden steering, depending on settings of transmission conditions for the obstacle point report, the obstacle point report may be still transmitted even though there is actually no stationary object as the obstacle. According to the configuration in which the obstacle point report includes the image frame when the avoidance action is performed, it is possible to restrict erroneous detection of the obstacle.

Figure 10:
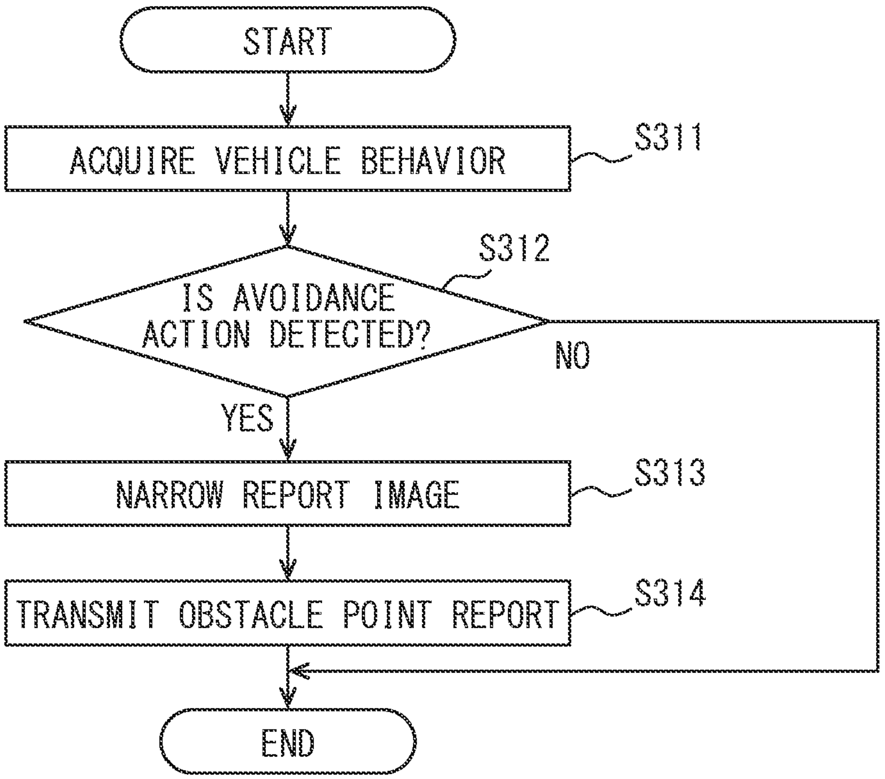
FIG. 10 is a flowchart illustrating another operation example of the map cooperation device.

Alternatively, the map cooperation device 50 may be configured to narrow down and transmit the image frame indicating the obstacle that causes the avoidance action, based on the vehicle behavior, from the multiple image frames captured within a predetermined period determined based on a time point when the avoidance action is performed. For example, as illustrated in FIG. 10, the map cooperation device 50 may be configured to perform the processes of Steps S311 to S314. The process flow illustrated in FIG. 10 can be performed as substitute processing of the process illustrated in FIG. 9.

Steps S311 to S312 are the same as Steps S301 to S302. The map cooperation device 50 performs Step S313 when the map cooperation device 50 detects the avoidance action being performed, based on the vehicle behavior data. In Step S313, the report data generation unit F5 performs a narrowing process for narrowing the image frame to be transmitted to the map server 2 as the report image, from the image frames acquired within a predetermined time before and after a time point when the avoidance action is detected. As the report image, it is preferable to select the image frame in which the obstacle is imaged as clearly as possible.

Figure 11:
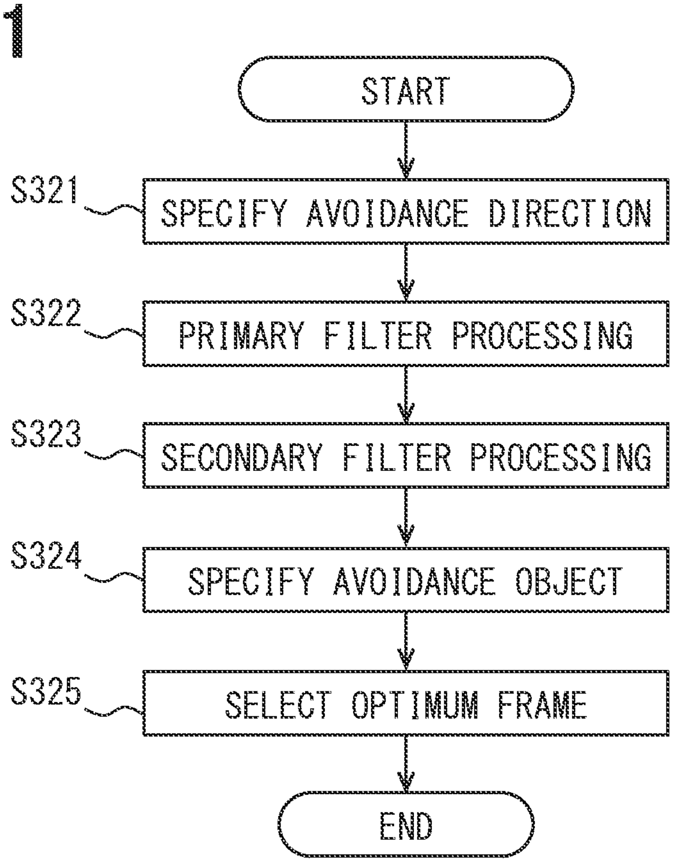
FIG. 11 is a flowchart corresponding to a narrowing process for a report image.

An example of the narrowing process is illustrated in FIG. 11. For example, as a preparatory process for the narrowing, the obstacle presence-absence determination unit F51 specifies the avoidance direction, based on the yaw rate acting on the vehicle (Step S321). As primary filter processing, the report data generation unit F5 extracts frames whose image capturing times are different by one second, from the image frames acquired within a predetermined period determined based on the time point when the avoidance action is detected (Step S322). That is, the image frames are cut down at an interval of one second.

Next, as secondary filter processing, the report data generation unit F5 extracts frames in which an avoidance object candidate is imaged, from the frames remaining after the primary filter processing (Step S323). In other words, in Step S323, the frame in which the avoidance object candidate is not imaged is discarded. Here, the avoidance object candidate indicates an object registered as the obstacle in object recognition dictionary data. Basically, all obstacles imaged in the image frame can be the avoidance object candidates. For example, the vehicle existing on the road or a material and equipment for road regulation can be the avoidance object candidate. The material and equipment for road regulation refers to a cone installed at a construction site, a signboard indicating a closed road, a signboard indicating a rightward or leftward arrow (so-called arrow board), or the like.

When the process in Step S323 is completed, the process proceeds to Step S324. In Step S324, the report data generation unit F5 sequentially compares the frames in which the avoidance object candidate is imaged, and specifies the avoidance object, based on a size of the avoidance object candidate in the image frame and a relationship between a time-dependent change pattern of a position and the avoidance direction of the subject vehicle. The avoidance object indicates the obstacle estimated to be avoided by the subject vehicle, that is, a cause of the avoidance action. For example, the avoidance object candidate whose position in the image frame moves in a direction opposite to the avoidance direction as the image capturing time advances is determined as the avoidance object.

When the avoidance object has been specified, the report data generation unit F5 selects an optimum frame which is the image frame in which the avoidance object is most properly imaged, from the multiple image frames (Step S325). For example, the report data generation unit F5 selects the frame in which the avoidance object is most clearly imaged. As the optimum frame, the report data generation unit F5 may select the frame in which the whole avoidance object is most largely imaged. As the optimum frame, the report data generation unit F5 may select the frame having a greatest probability value of correct of an identification result with respect to the avoidance object, in other words, the frame having a highest matching degree with model data of the obstacle. When the optimum frame is completely selected, the obstacle point report including the image frame as the report image is transmitted to the map server 2 (Step S314 in FIG. 10).

The report data generation unit F5 may cut out a portion in which the avoidance object is imaged in the optimum frame, and may transmit the portion as the report image. According to the configuration, an advantageous effect of reducing the amount of communication can be expected.

Figure 12:
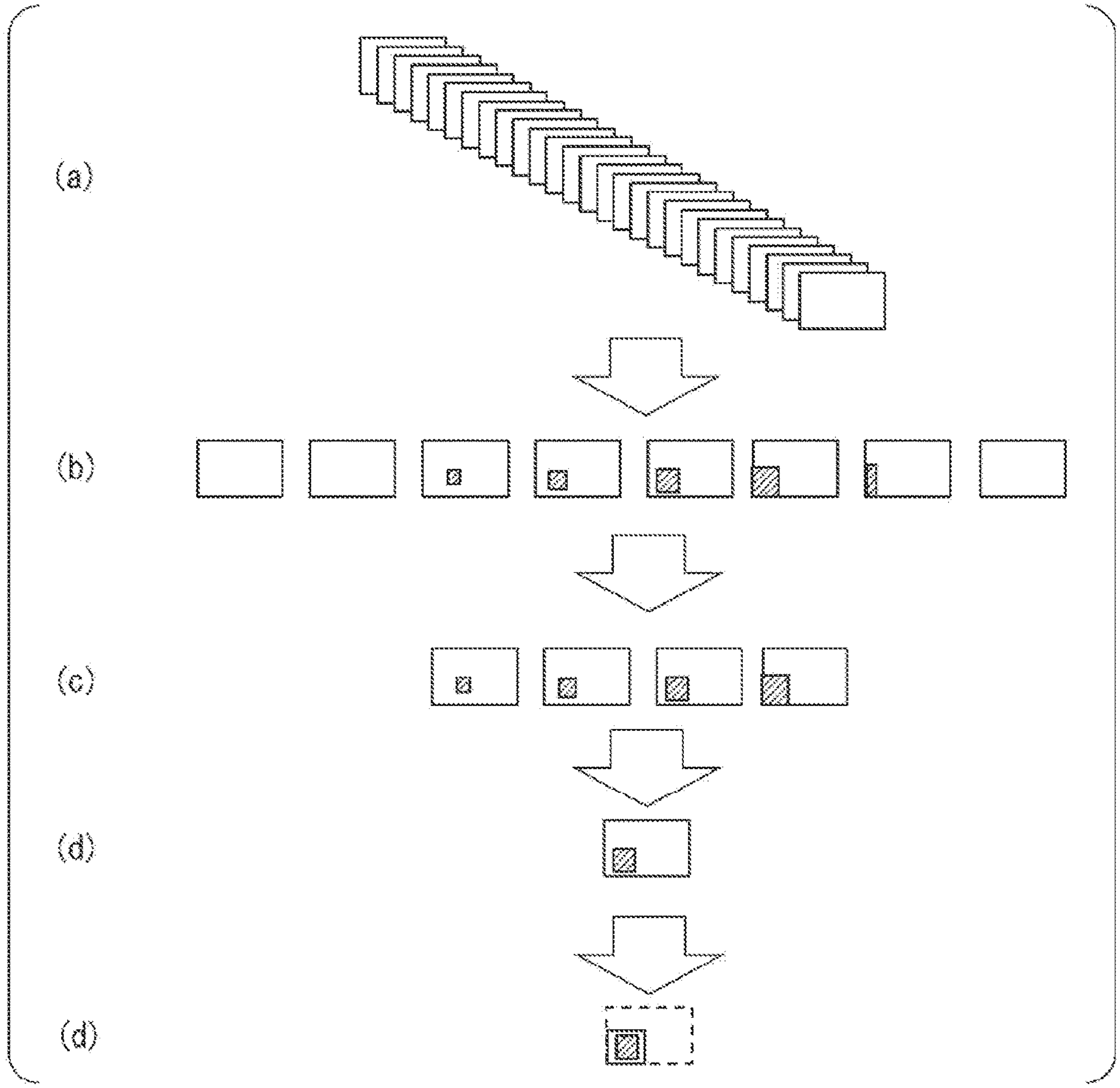
FIG. 12 is a figure conceptually illustrating an operation of a narrowing process for the report image.

FIG. 12 conceptually illustrates an operation of the above-described narrowing process, and (a) illustrates all image frames captured within a predetermined period after the avoidance action is performed; (b) illustrates a frame group cut down at a predetermined time interval by a primary narrowing process; (c) illustrates a collection of frames narrowed on a condition that an object which looks like the avoidance object, that is, the avoidance object candidate is imaged; (d) illustrates a finally selected image frame; (e) illustrates a state where a partial image in which the avoidance object is imaged is cut out. Since the primary filter processing is included in the narrowing process of the report image, a processing load of the report data generation unit F5 can be reduced. Since the secondary filter processing is performed, it is possible to reduce a risk of misselecting the image frame without the avoidance object as the report image.

As the primary filter processing, an interval for cutting down the image frames is not limited to one second, and may be 500 milliseconds. The primary filter processing is not an essential element, and can be omitted. However, since the primary filter processing is performed, it is possible to reduce load of the processing unit 51 serving as the report data generation unit F5. When the image frame from which the avoidance object candidate can be recognized does not exist or when the avoidance object cannot be specified, the image frame captured at a predetermined timing determined based on the detection time of the avoidance action may be selected as the optimum frame.

Figure 13:
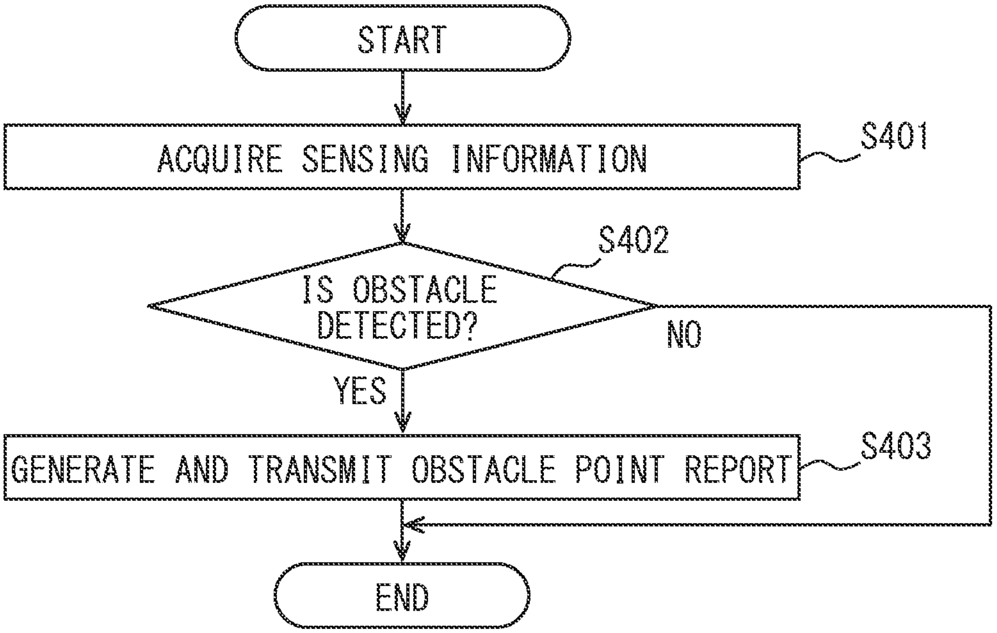
FIG. 13 is a flowchart illustrating an operation example of the map cooperation device.

Furthermore, as illustrated in FIG. 13, the map cooperation device 50 may be configured to perform the processes including Steps S401 to S403. For example, the process flow illustrated in FIG. 13 may be performed at a predetermined performance interval independently to the upload processing, or may be performed when it is determined in the upload processing that the obstacle registration point does not exist (Step S102 or Step S202: NO).

In Step S401, the sensing information for a latest predetermined time (for example, 5 seconds) is acquired, and Step S402 is performed. In Step S402, the obstacle presence-absence determination unit F51 determines whether the obstacle exists by analyzing the sensing information acquired in Step S401. When it is determined that the obstacle exists, the obstacle point report is prepared and uploaded in the same manner as that in Step S206. For example, the sensing information included in the obstacle point report uploaded in Step S403 can be the recognition results and the image frames of the respective surrounding monitoring sensors at a time point when it is determined that the obstacle exists. Similar to the obstacle point report transmitted in Step S303, the obstacle point report transmitted in Step S403 also corresponds to data indicating the existence of the obstacle which is not yet recognized by the map server 2.

<Regarding Configuration of Map Server 2>

Next, a configuration of the map server 2 will be described. The map server 2 is configured to detect appearance or disappearance of the obstacle, based on the obstacle point reports transmitted from the multiple vehicles, and to distribute the detection result to the vehicles as the obstacle information. The map server 2 corresponds to an obstacle information management device. The description of the vehicle as a communication partner of the map server 2 can be read as the in-vehicle system 1 and the map cooperation device 50.

Figure 14:
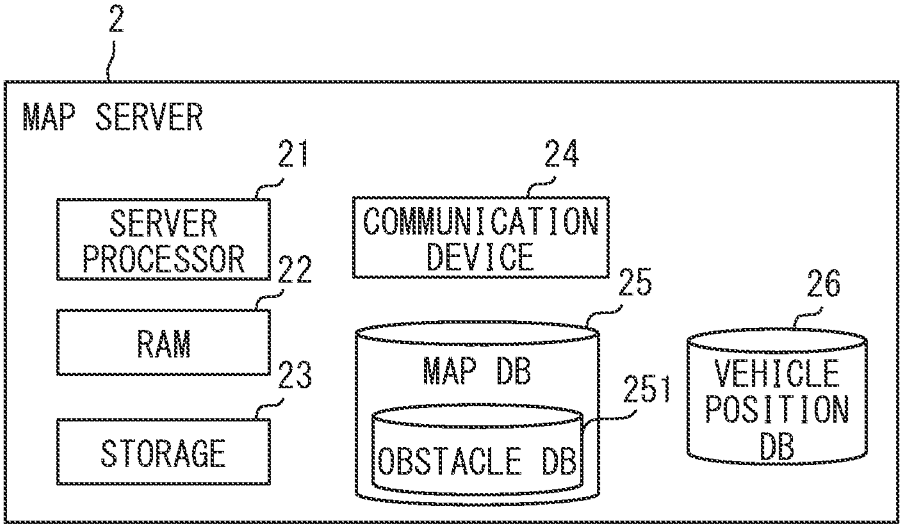
FIG. 14 is a block diagram illustrating a configuration of a map server.

As illustrated in FIG. 14, the map server 2 includes a server processor 21, a RAM 22, a storage 23, a communication device 24, a map DB 25, and a vehicle position DB 26. The DB in the member name indicates a database. The server processor 21 is hardware for calculation processing coupled with the RAM 52. The server processor 21 is configured to include at least one arithmetic core such as a central processing unit (CPU). The server processor 21 accesses the RAM 22 to perform various processes such as determination of an existence state of the obstacle. The storage 23 is configured to include a non-volatile storage medium such as a flash memory. The storage 23 stores an obstacle information management program which is a program executed by the server processor 21. Executing an obstacle information generation program by the server processor 21 corresponds to executing the obstacle information management method which is a method corresponding to the obstacle information management program. The communication device 24 is a device for communicating with other devices such as each in-vehicle system 1 via the wide area communication network 3.

The map DB 25 is a database that stores high accuracy map data, for example. The map DB 25 includes an obstacle DB 251 that stores information related to the point where the obstacle is detected. The map DB 25 and the obstacle DB 251 are databases realized by using a rewritable non-volatile storage medium. The map DB 25 and the obstacle DB 251 adopt a configuration in which the server processor 21 can write, read, and delete data.

The obstacle DB 251 stores data indicating the point where the obstacle is detected (hereinafter, referred to as obstacle point data). The obstacle point data indicates position coordinates of each obstacle point, a lane on which the obstacle exists, a type or a size of the obstacle, a lateral position inside the lane, an appearance time, and a latest existence determination time. For example, data regarding a certain obstacle point is periodically updated by the obstacle information management unit G3, based on the obstacle point report transmitted for the point from the vehicle. Data for each obstacle point forming the obstacle point data may be held in any optional data structure such as a list format. For example, the data for each obstacle point may be separately stored for each predetermined section. A section unit may be a mesh of the high accuracy map, may be an administrative section unit, or may be another section unit. For example, the section unit may be a road link unit. The mesh of the map indicates multiple small regions obtained by dividing the map in accordance with a prescribed rule. The mesh can also be called a map tile.

The vehicle position DB 26 is a database realized by using a rewritable non-volatile storage medium. The vehicle position DB 26 adopts a configuration in which the server processor 21 can write, read, and delete data. The vehicle position DB 26 stores data indicating a current status including a position of each vehicle forming the obstacle information distribution system 100 (hereinafter, referred to as vehicle position data) in association with the vehicle ID. The vehicle position data indicates the position coordinates, the traveling lane, the traveling direction, and the traveling speed of each vehicle. Data regarding a certain vehicle is updated by a vehicle position management unit G2 (to be described later). Each time the vehicle condition report is received from the vehicle. The data for each vehicle which forms the vehicle position data may be held by any optional data structure such as a list format. For example, data for each vehicle may be separately stored for each predetermined section. The section unit may be the mesh of the high accuracy map, may be the administrative section unit, or may be another section unit (for example, a road link unit).

The storage medium that stores information on the point where the obstacle is detected may be a volatile memory such as a RAM. A storage destination of the vehicle position data may also be the volatile memory. The map DB 25 and the vehicle position DB 26 may be configured to use multiple types of storage media such as a non-volatile memory and a volatile memory.

Figure 15:
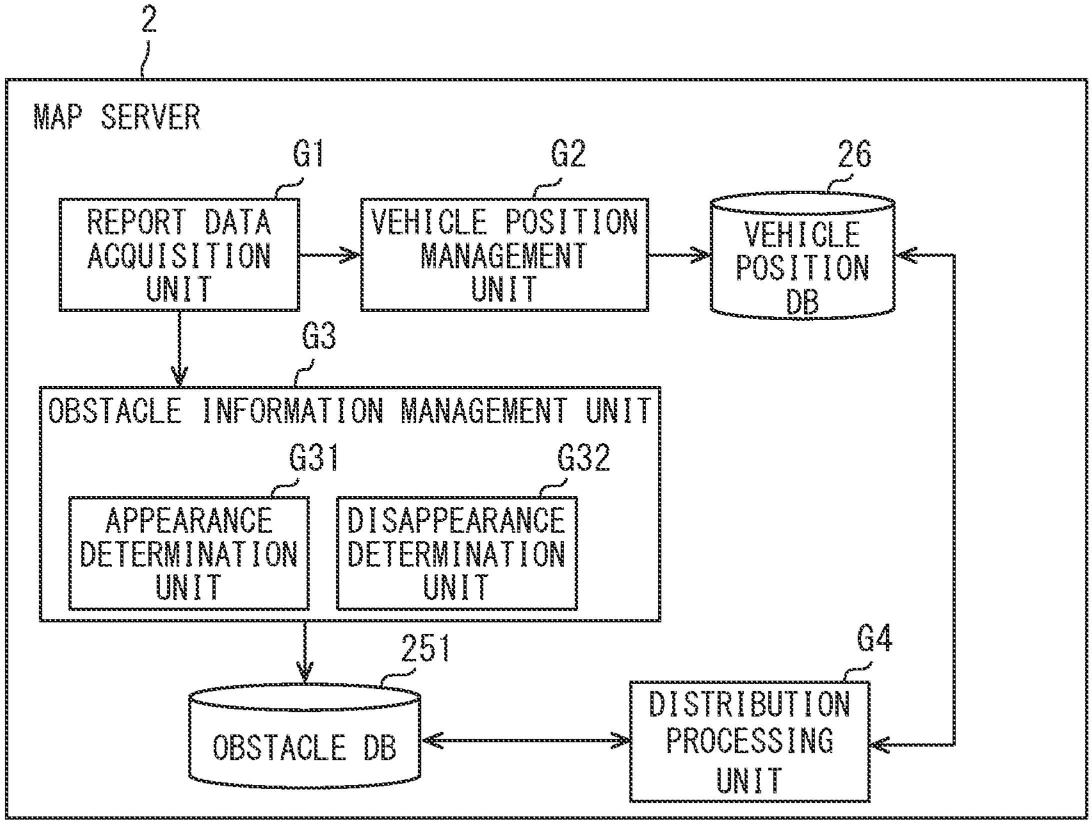
FIG. 15 is a block diagram illustrating a function of the map server provided by a server processor.

The map server 2 provides functions corresponding to various functional blocks illustrated in FIG. 15 by the server processor 21 executing the obstacle information management program stored in the storage 23. That is, as the functional blocks, the map server 2 includes a report data acquisition unit G1, a vehicle position management unit G2, an obstacle information management unit G3, and a distribution processing unit G4. The obstacle information management unit G3 includes an appearance determination unit G31 and a disappearance determination unit G32.

The report data acquisition unit G1 acquires the vehicle condition report and the obstacle point report which are uploaded from the in-vehicle system 1 via the communication device 24. The report data acquisition unit G1 provides the vehicle condition report acquired from the communication device 24 to the vehicle position management unit G2. The report data acquisition unit G1 provides the obstacle point report acquired from the communication device 24 to the obstacle information management unit G3. The report data acquisition unit G1 corresponds to a vehicle behavior acquisition unit.

The vehicle position management unit G2 updates the position information of each vehicle which is stored in the vehicle position DB 26, based on the vehicle condition report transmitted from each vehicle. That is, each time when the report data acquisition unit G1 receives the vehicle condition report, the vehicle position management unit G2 updates predetermined management items such as the position information on the transmission source of the vehicle condition report, the traveling lane, the traveling direction, and the traveling speed which are stored in the vehicle position DB 26.

The obstacle information management unit G3 updates the data for each obstacle point stored in the obstacle DB 251, based on the obstacle point report transmitted from each vehicle. Both the appearance determination unit G31 and the disappearance determination unit G32 which are included in the obstacle information management unit G3 are elements for updating the data for each obstacle point. The appearance determination unit G31 is configured to detect the appearance of the obstacle. The presence or absence of the obstacle is determined in units of the lane. As another aspect, the presence or absence of the obstacle may be determined in units of the road. The disappearance determination unit G32 is configured to determine whether the obstacle detected by the appearance determination unit G31 still exists, in other words, whether the detected obstacle has disappeared. The existence (disappearance) of the obstacle is determined for a certain obstacle registration point by the disappearance determination unit G32, based on the vehicle behavior data or the sensing information received after setting the point as the obstacle registration point. Details of the appearance determination unit G31 and the disappearance determination unit G32 will be separately described later.

The distribution processing unit G4 is configured to distribute the obstacle information. For example, the distribution processing unit G4 performs an obstacle notification process. The obstacle notification process is a process for distributing an obstacle notification packet which is a communication packet indicating information on the obstacle point, to a vehicle scheduled to pass through the obstacle point. The obstacle notification packet indicates the position coordinates of the obstacle, the lane ID in which the obstacle exists, and the type of the obstacle. For example, a destination of the obstacle notification packet can be a vehicle scheduled to pass through the obstacle point within a predetermined time (1 minute or 5 minutes). For example, whether the vehicle is scheduled to travel through the obstacle point may be determined by acquiring a traveling schedule path of each vehicle. The vehicle traveling on the road/lane which is the same as or connected to the road/lane on which the obstacle exists may be selected as the vehicle scheduled to pass through the obstacle point. A time required for the vehicle to reach the obstacle point can be calculated, based on a distance from the current position of the vehicle to the obstacle point and the traveling speed of the vehicle.

The distribution processing unit G4 selects the destination of the obstacle notification packet by using a road link or height information. Accordingly, it is possible to reduce a risk of misdistribution to the vehicle traveling on a road annexed on the upper/lower side of the road where the obstacle exists. In other words, it is possible to reduce a risk of misspecifying a distribution target in a road segment having an elevated road or a double-deck structure. The distribution target may be extracted, based on the position information or the traveling speed of each vehicle registered in the vehicle position DB 26.

Unnecessary distribution can be restricted by adding a time condition until the vehicle reaches the obstacle point to an extraction condition of the distribution target. Since an existence state of the obstacle can be dynamically changed, for example, even when the obstacle notification packet is distributed to a vehicle whose arrival time at the obstacle point has 30 minutes or longer left, there is a high possibility that the obstacle may disappear when the vehicle reaches the obstacle point. The time condition until the vehicle reaches the obstacle point can be any optional element, and may not be included in the extraction condition of the distribution target.

The distribution target may be determined in units of the lane. For example, when the obstacle exists in a third lane, the vehicle traveling on the third lane is set as the distribution target. The vehicle scheduled to travel on a first lane which is not adjacent to the obstacle lane may be excluded from the distribution target. The vehicle traveling on a second lane, which corresponds to an adjacent lane of the obstacle lane, needs to be aware about an interruption from the third lane which is the obstacle lane. Therefore, the vehicle may be included in the distribution target. As a matter of course, the distribution target may be selected in units of the road instead of units of the lane. According to the configuration in which distribution target is selected in units of the road, a processing load on the map server 2 can be alleviated.

For example, the obstacle notification packet can be distributed to multiple vehicles that satisfy conditions of the above-described distribution target by using a multicast method. The obstacle notification packet may be distributed by using a unicast method. When the obstacle notification packet is distributed by using the unicast method, the obstacle notification packet may be preferentially and sequentially transmitted from the vehicle closest to the obstacle point or the vehicle having an earliest arrival time in view of the vehicle speed. Even when the position of the obstacle is notified, a vehicle close to the obstacle point may not reflect the notification on the control, or the notification may not be made in time. Therefore, the vehicle may be excluded from the distribution target.

Alternatively, the distribution processing unit G4 may be configured to transmit the obstacle notification packet via a roadside device. In the configuration, the roadside device broadcasts the obstacle notification packet received from the distribution processing unit G4 to the vehicle existing inside a communication area of the roadside device by means of short range communication. The obstacle notification packet may be distributed to the vehicle within the predetermined distance from the obstacle registration point by using a geocast method. Various methods can be adopted as the information distribution method.

The distribution processing unit G4 performs a disappearance notification process. The disappearance notification process is a process for distributing a communication packet indicating that the obstacle has disappeared (hereinafter, referred to as a disappearance notification packet). For example, the disappearance notification packet can be distributed by using a multicast method to the vehicle to which the obstacle notification packet is transmitted. The disappearance notification packet is distributed as quickly as possible (that is, immediately) when the disappearance determination unit G32 determines that the obstacle has disappeared. The disappearance notification packet may be distributed by using the unicast method, as in the obstacle notification packet. When the disappearance notification packet is distributed by using the unicast method, the disappearance notification packet may be preferentially and sequentially transmitted from the vehicle closest to the obstacle point or the vehicle having an earliest arrival time in view of the vehicle speed. Even when a disappearance of the obstacle is notified, a vehicle close to the obstacle point may not reflect the notification on the control, or the notification may not be made in time. Therefore, the vehicle may be excluded from the distribution target. The distribution target of the disappearance notification packet is limited to the vehicle notified of the existence of the obstacle. Therefore, the distribution target is selected by using a road link or height information.

The distribution processing unit G4 may manage information on the vehicle to which the obstacle notification packet is transmitted, in the obstacle DB 251. Since the vehicle to which the obstacle notification packet is transmitted is managed, the distribution target of the disappearance notification packet can be easily selected. Similarly, the distribution processing unit G4 may manage the information on the vehicle which transmits the disappearance notification packet in the obstacle DB 251. Since whether the obstacle notification packet and/or disappearance notification packet are notified is managed by the map server 2, it is possible to reduce a possibility of repeatedly distributing the same information. Whether the obstacle notification packet and/or the disappearance notification packet are acquired may be managed by using a flag on the vehicle side. The obstacle notification packet or the disappearance notification packet corresponds to obstacle information.

<Regarding Server-Side Processing>

Figure 16:
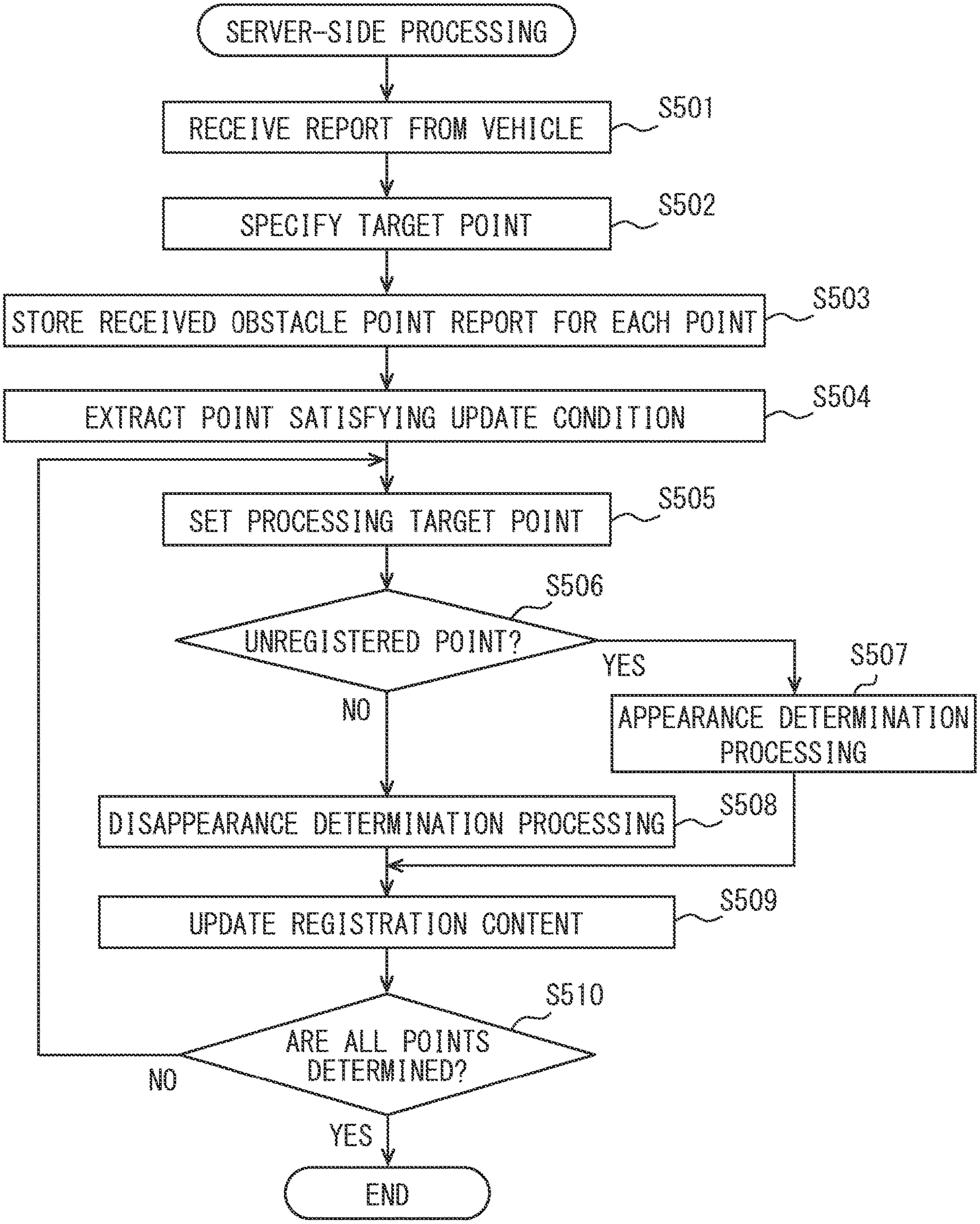
FIG. 16 is a flowchart describing a process in the map server.

An obstacle point registration process performed by the map server 2 will be described with reference to a flowchart illustrated in FIG. 16. The flowchart illustrated in FIG. 16 may be performed, for example, at a predetermined update cycle. It is preferable to set the update cycle to a relatively short time such as 5 minutes or 10 minutes.

In the map server 2, the server processor 21 repeats a process for receiving the obstacle point report transmitted from the vehicle at a prescribed cycle (Step S501). Step S501 corresponds to a vehicle behavior acquisition step. When the server processor 21 receives the obstacle point report, the server processor 21 specifies a point serving as a report target of the received obstacle point report (Step S502), classifies the received obstacle point report for each point, and stores the obstacle point report (Step S503). Considering that the position information reported in the obstacle point report varies, the obstacle point report may be stored for each section having a predetermined length.

The server processor 21 extracts the point satisfying a predetermined update condition (Step S504). For example, the point where the number of reports received within a predetermined time is equal to or greater than a predetermined threshold value and where a predetermined waiting time elapses after an obstacle presence-absence determination processing, is extracted as an update target point. For example, the waiting time can be relatively short, such as 3 minutes or 5 minutes. The update condition may be a point where the number of received reports is equal to or greater than the predetermined threshold value, or may be a point where the predetermined waiting time elapses after the previous update.

A condition for performing appearance determination processing (to be described later) and a condition for performing disappearance determination processing may be different. The number of received reports for performing the appearance determination processing may be less than the number of received reports receptions for performing the disappearance determination processing. For example, whereas the number of received reports for performing the appearance determination processing may be set to 3 times, the number of received reports for performing the disappearance determination processing may be doubled to 6 times. According to this configuration, the appearance of the obstacle can be quickly detected, and determination accuracy can be improved in determining the disappearance of the obstacle.

When the update target points are completely extracted, any one of the update target points is set as a processing target (Step S505), and it is determined whether the point is registered as the obstacle point or whether the point is unregistered. When the processing target point is unregistered as the obstacle point, the appearance determination unit G31 performs the appearance determination processing (Step S507). Step S507 corresponds to the appearance determination step. On the other hand, when the processing target point is registered as the obstacle point, the disappearance determination unit G32 performs the disappearance determination processing (Step S508). Step S508 corresponds to the disappearance determination step. Based on the determination result of the appearance determination processing or the disappearance determination processing, registered contents of the obstacle DB 251 are updated (Step S509).

For example, information on the point where appearance of the obstacle is determined is additionally registered in the obstacle DB 251. For the point where disappearance of the obstacle is determined, the point information is deleted from the obstacle DB 251, or a disappearance flag indicating that the obstacle has disappeared is set. The data of the obstacle point for which the disappearance flag is set may be deleted at a timing when a predetermined time (for example, one hour) elapses after the flag is set. A change in the registration contents for the point where an existence state is not changed can be omitted. For the point where the existence state is not changed, only time information at which the determination is made may be updated to latest information (that is, a current time).

When the appearance determination processing or the disappearance determination processing is completed for all of the update target points extracted in Step S504, this flow ends. On the other hand, when the unprocessed point remains, the unprocessed point is set as the target point, and the appearance determination processing or disappearance determination processing is performed (Step S510).

<Regarding Appearance Determination Processing>

Here, the appearance determination processing performed by the appearance determination unit G31 will be described. The appearance determination unit G31 determines whether the obstacle has appeared at a determination target point by using a lane change, a change pattern of acceleration/deceleration of a vehicle in a traffic flow, a camera image, an obstacle recognition result obtained by the in-vehicle system 1, and a change pattern of a traffic volume for each lane. The expression of the point here includes a concept of a section having a predetermined length.

For example, the appearance determination unit G31 determines that the obstacle exists at the point where the number of lane changes within a prescribed time, which is equal to or greater than a predetermined threshold value. Whether the lane is changed may be determined by using a determination result or a report in the vehicle, or may be detected from a traveling trajectory of the vehicle. The appearance determination unit G31 may determine that the obstacle has appeared at the point where the lanes are consecutively changed for a predetermined number of vehicles (for example, three vehicles) or more.

Figure 17:
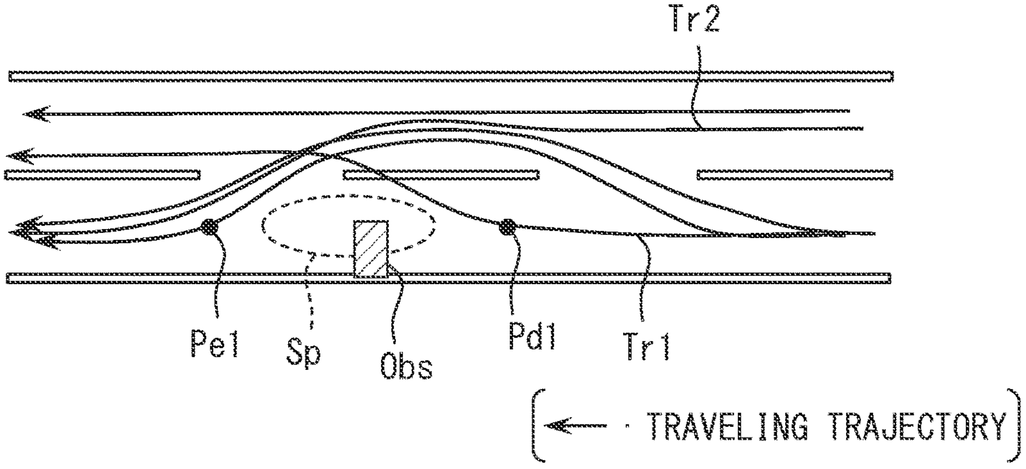
FIG. 17 is a figure describing an operation of an appearance determination unit.

For example, the position of the obstacle based on the lane change can be determined, based on a traveling trajectory Tr1 whose lane change timing is latest in traveling trajectories of multiple vehicles whose lanes are changed as illustrated in FIG. 17. For example, it is determined that an obstacle Obs exists at a point in the traveling direction by a predetermined distance (for example, 5 m) further from a separation point (hereinafter, referred to as a rearmost separation point) Pd1 located on the closest side in the traveling direction in the corresponding lane. The separation point may be a point where a steering angle exceeds a predetermined threshold value, or may be a point where the offset amount from the lane center is equal to or greater than a predetermined threshold value. Alternatively, the separation point may be a point where the vehicle starts crossing the lane boundary. In order to allow a certain degree of errors, the obstacle point here has a predetermined width in the front-rear direction. The front-rear direction here corresponds to an extending direction of the road.

The position of the obstacle may be determined, based on a position of a return point (hereinafter, referred to as a frontmost return point) Pe1 closest to the rearmost separation point Pd1. For example, the position of the obstacle may be an intermediate point between the rearmost separation point Pd1 and the frontmost return point Pe1. The return point can be a point where the steering angle of the lane changed vehicle enters the lane on which the obstacle is estimated to exist is smaller than a predetermined threshold value. The return point may be a point where the offset amount from the lane center of the lane changed vehicle entering the lane on which the obstacle is estimated to exist is smaller than a predetermined threshold value. Instead of the steering angle, an angle of a vehicle body with respect to a road extending direction may be adopted. Alternatively, the position of the obstacle may be determined, based on the obstacle detection position information included in the obstacle point report. When the obstacle detection positions for the same obstacle point can be acquired from multiple vehicles, an average position thereof may be adopted as the position of the obstacle.

Incidentally, as the avoidance action for avoiding the obstacle, a lane change to be separated to the adjacent lane (hereinafter, referred to as separating lane change) and a lane change to return to the original lane (hereinafter, referred to as returning lane change) are performed as a set in many cases. However, as indicated by the traveling trajectory Tr1, the vehicle having changed lanes due to the existence of the obstacle may not return to the original lane. For example, when the vehicle is scheduled to turn right after passing through a lateral part of the obstacle, or when there is no vacant space for returning to the original lane due to other vehicles, the vehicle does not return to the original lane. As illustrated by the traveling trajectory Tr2, it is conceivable that the vehicle traveling on the lane adjacent to the obstacle changes the lane to the obstacle lane after passing along the lateral part of the obstacle. Without counting the number of vehicles already performed both the separating lane change and the returning lane change, the server processor 21 can more quickly detect the appearance of the obstacle by extracting locations where each type of the lane changes is concentrated as the obstacle point. As a matter of course, as another aspect, the obstacle point may be detected, based on the number of vehicles already performed both the separating lane change and the returning lane change.

As illustrated in FIG. 17, the point where the obstacle exists appears on the map, as a region (hereinafter, referred to as a trackless region Sp) where the traveling trajectory of the vehicle temporarily does not exist. The appearance determination unit G31 may determine the presence or absence of the trackless region Sp, based on the traveling trajectories of multiple vehicles within a predetermined time. The appearance determination unit G31 may set the point which is the trackless region Sp, as the obstacle point. That is, the appearance determination unit G31 may detect that the obstacle has appeared, based on occurrence of the trackless region Sp. When a fallen object is assumed as the obstacle, to be distinguished from lane regulations, it is preferable that the trackless region Sp regarded as existence of the obstacle is limited to a region having a length smaller than a predetermined length (for example, 20 m). In other words, when the length of the trackless region Sp is equal to or greater than a predetermined threshold value, the appearance determination unit G31 may determine that the type of the obstacle is the road construction or the lane regulations, instead of the fallen object.

The appearance determination unit G31 may detect the appearance of the obstacle, based on the image data included in the obstacle point report. For example, it may be determined from camera images of multiple vehicles that the obstacle exists, based on confirmation that the obstacle exists on the lane. The appearance determination unit G31 may set an image region on an opposite side in the avoidance direction from a predetermined reference point in the camera image provided from the vehicle as the report image, as a verification area, and may perform image recognition processing for specifying the obstacle only on the verification area. The avoidance direction of the vehicle may be specified, based on the behavior data of the vehicle. The verification area can also be called an analysis area or a search area.

Figure 18:
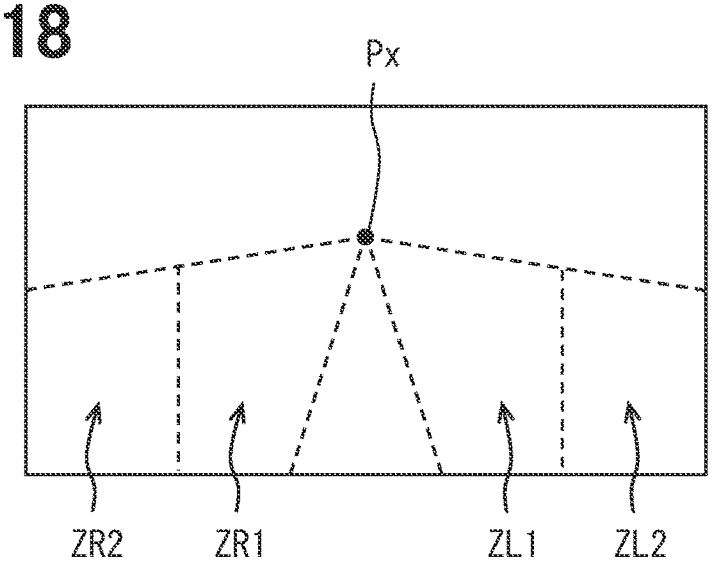
FIG. 18 is a figure illustrating an example of a setting aspect of a verification area.
Figure 19:
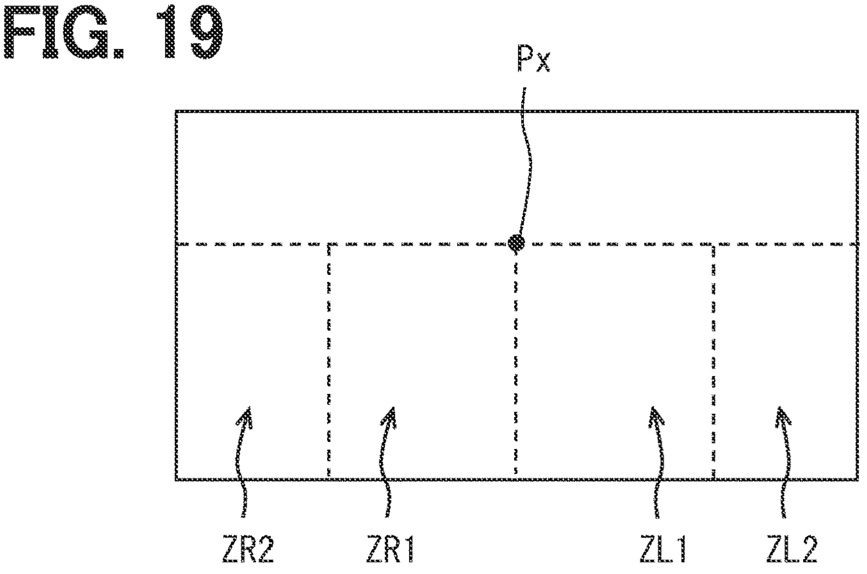
FIG. 19 is a figure illustrating another example of the setting aspect of the verification area.

The verification area corresponding to the avoidance direction can be set as illustrated in FIG. 18, for example. Px illustrated in FIG. 18 is a reference point, and is a center point of a fixed image frame, for example. The reference point Px may be a disappearing point at which regression lines of the roadside or the lane mark intersect. ZR1 and ZR2 in FIG. 18 are verification areas applied when the avoidance direction is to the right. ZR2 can be a range to be searched when the avoidance object candidate is not found in ZR1. ZL1 and ZL2 in FIG. 18 are verification areas applied when the avoidance direction is to the left. ZL2 can be a range to be searched when the avoidance object candidate is not found in ZL1. The verification area corresponding to the avoidance direction is not limited to a setting aspect illustrated in FIG. 18. Various setting aspects can be adopted for the verification area, as illustrated in FIG. 19. A dashed line in the drawing conceptually indicates a boundary line of the verification area.

According to the above-described configuration, a range of image recognition for specifying obstacles is limited. Therefore, a processing load on the map server 2 can be reduced. The avoidance object can be quickly specified. Introducing the verification area can also be applied to determining the disappearance of the obstacle by the disappearance determination unit G32 (to be described later). According to a configuration for determining whether the obstacle exists only inside the verification area, it is possible to reduce the time or the processing load required for determining whether the obstacle has disappeared and/or does not exist. The map cooperation device 50 may also perform a process for searching and narrowing the avoidance object by using a concept of the verification area. The map cooperation device 50 may be configured to cut out only the image region corresponding to the verification area according to the avoidance direction, and may transmit the cut image region as the report image. For example, when the avoidance direction is the right direction, the map cooperation device 50 may transmit a partial image region including the verification areas ZL1 and ZL2, as the report image.

The appearance determination unit G31 may determine that the obstacle exists, based on the detection results of the obstacle which are included in the obstacle point reports from multiple vehicles and acquired by the surrounding monitoring sensors. For example, when the number of reports indicating the existence of the obstacle within a latest predetermined time is equal to or greater than a predetermined threshold value, it may be determined that the obstacle exists at the point where the report is transmitted.

Alternatively, the appearance determination unit G31 may detect the point where a predetermined acceleration/deceleration pattern occurs, as the obstacle point. Normally, the driver's seat occupant and/or the autonomous driving system recognizing the existence of the obstacle in front of the vehicle decelerates the vehicle once, and accelerates the vehicle again after the traveling position is changed. That is, it is assumed that the acceleration/deceleration pattern, such as accelerating again after decelerating, can be observed in the vicinity of the obstacle point. Paradoxically, an area in which an occurrence frequency and/or the number of consecutive occurrences of the acceleration/deceleration pattern is equal to or greater than a predetermined threshold value within the latest predetermined time may be extracted as the obstacle point. The change in the traveling position here includes not only the lane change but also moving the traveling position inside the same lane to either a right corner or a left corner, or traveling across the lane boundary.

For example, even when a moving object such as a bird, a pedestrian, or a wild animal exists as a momentary obstacle, an acceleration/deceleration pattern in which the vehicle is accelerated again after decelerated once can be observed. In view of the circumstances, it is preferable the obstacle point is detected by using the acceleration/deceleration pattern while the obstacles accompanied by the change in the traveling position are used as a population. In other words, it is preferable that the appearance determination unit G31 detects an area where the predetermined acceleration/deceleration pattern can be observed together with the change in the traveling position, as the obstacle point.

Hitherto, an aspect is disclosed in which the acceleration in the front-rear direction is used to detect the obstacle point. However, when the traveling position is changed to avoid the obstacle, it is assumed that a predetermined pattern also occurs in the acceleration in the lateral direction. For example, an area in which an occurrence frequency and/or the number of consecutive occurrences of the predetermined acceleration/deceleration pattern in the left-right direction within the latest predetermined time is equal to or greater than a predetermined threshold value may be extracted as the obstacle point.

It is expected that a traffic volume in the lane on which the obstacle exists is smaller than a traffic volume in the adjacent lane. The lane whose traffic volume in the latest predetermined time decreases by a predetermined value and/or a predetermined ratio compared to the traffic volume before a predetermined time may be extracted, and when the traffic volume in the adjacent lane increases in the same time period, it may be determined that the obstacle exists on the lane. Where the obstacle exists in any lane detected by using the above-described method can be specified from the traveling trajectory of the vehicle traveling on the lane.

The appearance determination unit G31 may detect the obstacle point, based on a fact that the autonomous driving device transfers an authority to an occupant or a fact that the driver's seat occupant overrides the authority. For example, the appearance of the obstacle may be detected by acquiring and analyzing the image of the front camera 11 when the autonomous driving device transfers the authority to the occupant or when the driver's seat occupant overrides the authority, and determining whether the cause is the obstacle.

Hitherto, multiple viewpoints for determining that the obstacle has appeared have been described as examples. However, the appearance determination unit G31 may determine that the obstacle has appeared by using any one of the above-described viewpoints. It may be determined that the obstacle has appeared by complexly combining multiple viewpoints. When determining that the obstacle has appeared by complexly combining multiple viewpoints, the appearance of the obstacle may be determined by applying a weight corresponding to a type of determination criteria. For example, when the weight for the avoidance action is set to 1, the recognition result in the camera alone may be set to 1.2, and the recognition result obtained by sensor fusion may be set to 1.5.

As illustrated in FIG. 20, as a result of analyzing the image provided from the vehicle by the server processor 21 and/or an operator, depending on whether the existence of the obstacle can be confirmed, a threshold value regarding the number of vehicles already performed the avoidance action to determine the existence of the obstacle may be changed. The number of vehicles already performed the avoidance action required for determining that the obstacle exists may be changed, depending on whether the obstacle is detected by the surrounding monitoring sensor of the vehicle or the obstacle presence-absence determination unit F51. A column for the number of vehicles in FIG. 20 can be replaced with a ratio of the number of vehicles already performed the avoidance action, or the number of consecutively received obstacle point reports indicating that the avoidance action is performed.

<Regarding Disappearance Determination Processing>

Here, the disappearance determination processing performed by the disappearance determination unit G32 will be described. The disappearance determination unit G32 is configured to periodically determine whether the obstacle still exists at the obstacle point detected by the appearance determination unit G31, based on the obstacle point report. As a determination criterion for determining that the obstacle has disappeared, it is possible to adopt the presence or absence of the lane change, the traveling trajectory of the vehicle, the change pattern of acceleration/deceleration of the vehicle in a traffic flow, the camera image, the recognition result of the obstacle recognized by the in-vehicle system 1, and the change pattern of the traffic volume in each lane.

For example, the disappearance determination unit G32 can determine the disappearance of the obstacle, based on a decrease in the number of lane changes at the obstacle point. For example, when the number of lane changes in the vicinity of the obstacle point is smaller than a predetermined threshold value, it may be determined that the obstacle has disappeared. The disappearance determination unit G32 may determine that the obstacle has disappeared, when a statistically significant difference has appeared by comparing a decrease in the number of lane changes in the vicinity of the obstacle point as the vehicle behavior with a time point when the obstacle is detected.

The disappearance determination unit G32 may determine that the obstacle has disappeared, based on a decrease in the number of vehicles traveling across the lane boundary in the vicinity of the obstacle point. The disappearance determination unit G32 may determine that the obstacle has disappeared, based on a fact that the average value of the offset amounts from the lane center in the obstacle lane is equal to or smaller than a predetermined threshold value. That is, the disappearance determination unit G32 may determine that the obstacle has disappeared, when the change amount of the lateral position of the vehicle passing through the vicinity of the obstacle point is equal to or smaller than a predetermined threshold value.

The disappearance determination unit G32 may determine that the obstacle has disappeared, based on the appearance of the vehicle that continues to pass through the lane including the obstacle point (that is, the obstacle lane) without performing the avoidance action such as the lane change. For example, the appearance of the vehicle traveling through the obstacle point can be determined, based on the traveling trajectory. More specifically, it may be determined that the obstacle has disappeared, when the traveling trajectory of a certain vehicle passes through the obstacle point. It may be determined that the obstacle has disappeared, when the number of vehicles exceeds a predetermined threshold value.

When the obstacle point report includes the camera image, the disappearance determination unit G32 may analyze the camera image to determine whether the obstacle still exists. The disappearance determination unit G32 may statistically process an analysis result of the image data transmitted from multiple vehicles to determine whether the obstacle still exists. The statistical processing here includes majority voting or averaging.

When the obstacle point report includes information indicating whether the surrounding monitoring sensor has detected the obstacle (that is, a detection result of the obstacle), the disappearance determination unit G32 may statistically process the information to determine whether the obstacle still exists or has disappeared. For example, it may be determined that the obstacle has disappeared, when the number of receiving times of the reports indicating that the obstacle is not detected is equal to or greater than a predetermined threshold value.

The disappearance determination unit G32 may determine that the obstacle has disappeared, when a predetermined acceleration/deceleration pattern is no longer observed as the behavior of the vehicle passing through the vicinity of the obstacle point. It may be determined that the obstacle has disappeared, based on a fact that there is no longer a significant difference in the traffic volume between the obstacle lane and the right and left adjacent lanes, a fact that the difference is narrowed, or a fact that the traffic volume in the obstacle lane increases. For example, the traffic volume can be the number of vehicles in a traffic flow per unit time in a road segment from the obstacle point to 400 m in front of the obstacle point.

Multiple viewpoints for determining that the obstacle has disappeared have been described as an example. However, the disappearance determination unit G32 may determine that the obstacle has disappeared by using any one of the above-described viewpoints, or may determine that the obstacle has disappeared by complexly combining and using the multiple viewpoints. When determining that the obstacle has disappeared by complexly combining and using the multiple viewpoints, the disappearance of the obstacle may be determined by applying a weight corresponding to a type of determination criteria. When the weight for the vehicle behavior is set to 1, the recognition result in the camera alone may be set to 1.2, and the recognition result obtained by sensor fusion may be set to 1.5.

As illustrated in FIG. 21, as a result of analyzing the image provided from the vehicle by the server processor 21 and/or an operator, depending on whether the disappearance of the obstacle is confirmed, a threshold value regarding the number of vehicles straightly traveling to the point to determine the disappearance of the obstacle may be changed. Depending on whether the obstacle is detected by the surrounding monitoring sensor of the vehicle or the obstacle presence-absence determination unit F51, a threshold value for the number of vehicles straightly traveling to the point to determine the disappearance of the obstacle may be changed. A column for the number of vehicles in FIG. 21 can be replaced with a ratio of the number of vehicles straightly traveling to the point, or the number of consecutively received obstacle point reports indicating that the obstacle does not exist. The term "straight traveling" here indicates traveling along the subject vehicle traveling lane so far without changing the traveling position such as the lane change. The straight traveling here does not necessarily indicate traveling while the steering angle is maintained at 0°.

<Supplement of Method for Determining Appearance/Disappearance of Obstacle>

Static map elements such as a road structure are map elements having insufficient time-dependent changes. Therefore, many traveling trajectories accumulated over a period of one week to one month can be used to update the map data regarding the map elements. According to a configuration in which the map data is updated while the reports from many vehicles are used as a population, it is expected that accuracy is improved.

However, the obstacle such as a fallen object corresponds to a dynamic map element whose existence state is changed in a relatively short time, compared to the road structure. Therefore, detecting the appearance and the disappearance of the obstacle requires better real-time performance. In order to improve the accuracy of the information such as the existence state or the position of the obstacle, it is preferable to use the reports from many vehicles as the population. However, collecting more reports from the vehicles takes a lot time, thereby impairing the real-time performance. That is, in a configuration for detecting the existence/disappearance of the obstacle, in order to ensure the real-time performance, compared to a case of generating the static map, it is necessary to determine and distribute the information as accurately as possible from less vehicle reports.

Under the above-described circumstances, for example, the above-described appearance determination unit G31 detects the obstacle point, based on the obstacle point report acquired within a predetermined first time period from the current time. The disappearance determination unit G32 determines the disappearance/existence of the obstacle, based on the obstacle point report acquired within a predetermined second time period. For example, it is preferable that both the first time period and the second time period are set to a time shorter than 90 minutes, in order to ensure the real-time performance. For example, the first time period is set to 10 minutes, 20 minutes, or 30 minutes. The second time period can also be set to 10 minutes, 20 minutes, or 30 minutes. The first time period and the second time period may have the same length, or may have different lengths. The first time period and the second time period may be 5 minutes or one hour.

In a certain viewpoint, the information indicating that the obstacle has appeared is more useful for traveling control, compared to the information indicating that the obstacle has disappeared. The reason is shown as below. When the information on the lane on which the obstacle exists can be acquired in advance as the map data, the avoidance action can be planned and performed with a sufficient time margin. Consequently, a demand for detecting and distributing the existence of the obstacle earlier is assumed. Under the above-described circumstances, the first time period may be set to be shorter than the second time period in order to quickly start detecting and distributing the existence of the obstacle.

A demand for avoiding erroneous determination and erroneous distribution of the fact that the obstacle has disappeared even though the obstacle still exists is also assumed. In view of the demand, the second time period may be set to be longer than the first time period. According to the configuration in which the second time period is set to be longer than the first time period, the occurrence of the obstacle can be quickly notified, and a possibility of erroneously determining that the obstacle has disappeared can be reduced.

For example, the appearance determination unit G31 and the disappearance determination unit G32 may be configured to preferentially use information indicated in the report whose acquisition time is latest by, for example, increasing the weight, and to determine an appearance/existence state of the obstacle. For example, when the weight of the information acquired within 10 minutes is set to 1, the statistical processing may be performed by applying a weighting coefficient corresponding to freshness of the information, such as setting the weight of the information acquired within 30 minutes and 10 minutes or longer in the past to 0.5, and setting the weight of the information acquired earlier in the past to 0.25. According to this configuration, a latest state can be better reflected on the determination result, and the real-time performance can be improved.

The statistical processing may be performed by applying the weight in accordance with characteristics of a report source. For example, the weight of the report from the autonomous driving vehicle may be set to be high. It can be expected that the millimeter wave radar 12, the front camera 11, and the LiDAR which have relatively high-performance are mounted on the autonomous driving vehicle. There is a low possibility that the autonomous driving vehicle may unnecessarily change the traveling position. There is a high possibility that the changing the traveling position in the autonomous driving vehicle may be a movement to relatively avoid the obstacle. Therefore, determination accuracy in determining the presence or absence of the obstacle can be improved by preferentially using the report from the autonomous driving vehicle.

The appearance determination unit G31 and the disappearance determination unit G32 may adopt a configuration as follows. A report from an unstable traveling position vehicle which is a vehicle frequently changing the traveling position such as the lane change may be regarded as noise, and may not be used in the determination processing. The unstable traveling position vehicle may be specified by the vehicle position management unit G2, based on sequentially uploaded vehicle condition reports, and may be managed by using a flag. According to this configuration, it is possible to reduce a risk of misdetermining the presence or absence of the obstacle, based on a report from a vehicle driven by a user who frequently changes lanes. Various conditions can be applied to conditions for regarding the vehicle as the unstable traveling position vehicle. For example, a vehicle in which the number of lane changes within a prescribed time is equal to or greater than a predetermined threshold value may be extracted as the unstable traveling position vehicle. It is preferable that the threshold value here is set to 3 times or more in order to exclude the lane changes (two times, separating and returning) for avoiding the obstacle. For example, the unstable traveling position vehicle can be a vehicle changing the lane four times or more within a prescribed time, such as 10 minutes.

As illustrated in FIGS. 20 and 21, a condition for determining that the obstacle has appeared (for example, a threshold value) and a condition for determining that the obstacle has disappeared may be different. For example, the condition for determining that the obstacle has disappeared may be set to be stricter than the condition for determining that the obstacle has appeared. The determination criterion for determining that the obstacle has appeared and the determination criterion for determining that the obstacle has disappeared may be different from each other. The weight for each information type may be different between the time when determining the appearance and the time when determining the disappearance. For example, whereas the weight of the analysis result of the camera image may be set to be higher than the weight of the vehicle behavior data when determining that the obstacle has appeared, the weight of the vehicle behavior data may be set to be higher than the weight of the analysis result of the camera image when determining that the obstacle has disappeared. The reason is shown as below. Whereas the camera image is suitable for verifying the existence of the object, the camera image is less reliable for verifying the absence of the object, for example, in view of a possibility that an image may be captured at another place.

Alternatively, at least one of the appearance determination unit G31 and the disappearance determination unit G32 may determine whether the obstacle is a light material movable by the wind, for example, such as styrene foam, based on variations in the obstacle detection positions reported from multiple vehicles.

<Example of Application to Vehicle Control>

Figure 22:
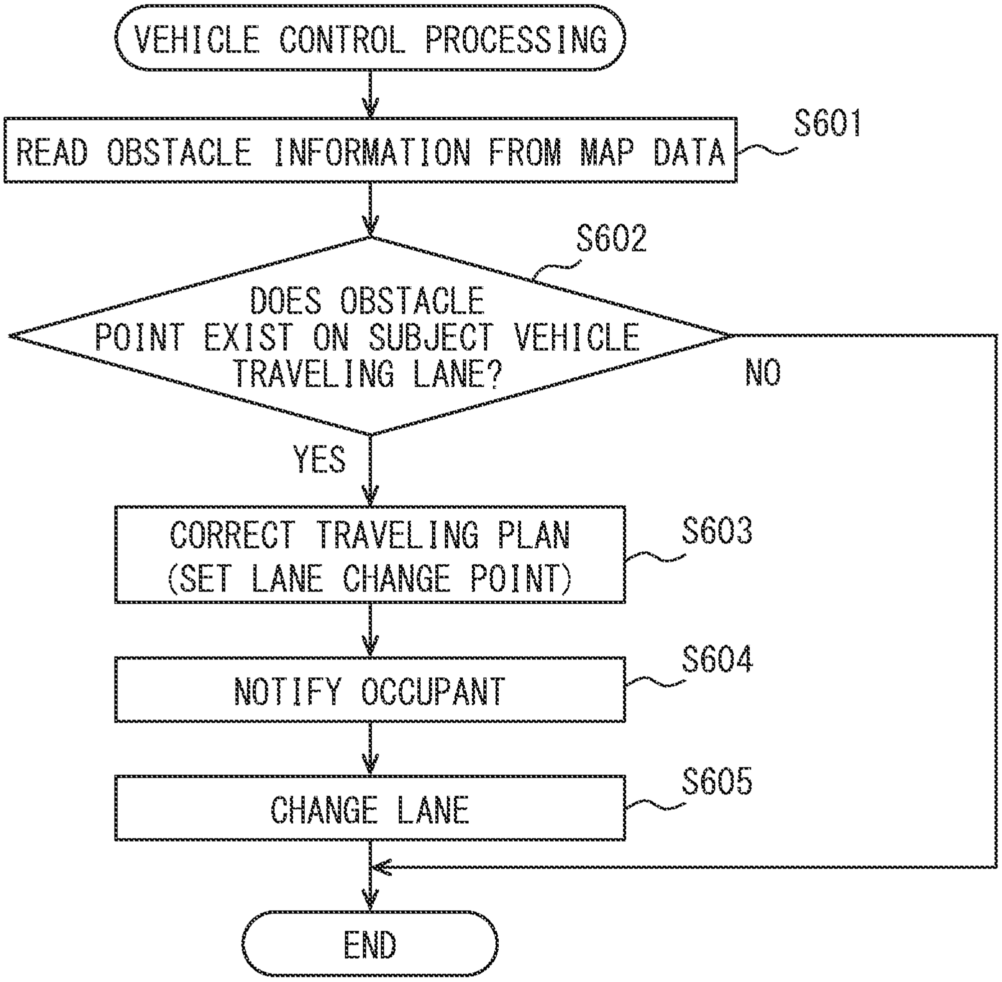
FIG. 22 is a flowchart illustrating an example of vehicle control using obstacle information.

Next, a vehicle control example of using the obstacle information will be described with reference to FIG. 22. For example, a process in FIG. 22 may be performed independently of the above-described upload processing. For example, a vehicle control processing illustrated in FIG. 22 may be performed at a predetermined cycle, when an autonomous lane change function of the driver-assistance ECU 60 is activated based on a user operation. A state where the autonomous lane change function is activated includes a state during autonomous driving in which the vehicle autonomously travels in accordance with a predetermined traveling plan. As an example, the vehicle control processing illustrated in FIG. 22 includes Steps S601 to S605. Steps S601 to S605 are performed in cooperation with the driver-assistance ECU 60 and the map cooperation device 50.

First, in Step S601, the map cooperation device 50 reads the on-map obstacle information stored in the memory M1, provides the on-map obstacle information to the driver-assistance ECU 60, and the process proceeds to Step S602. In Step S602, the driver-assistance ECU 60 determines whether the obstacle exists within a predetermined forward distance on the subject vehicle traveling lane, based on the on-map obstacle information. The process corresponds to a process for determining whether the obstacle recognized by the map server 2 exists within the predetermined distance, that is, whether the obstacle registration point exists. When the obstacle does not exist on the subject vehicle traveling lane, the determination in Step S602 is negative, and this flow ends. In this case, the traveling control based on the separately prepared traveling plan is continued. On the other hand, when the obstacle exists on the subject vehicle traveling lane, the determination in Step S602 is affirmative, and Step S603 is performed.

In Step S603, the traveling plan is corrected. That is, the traveling plan is prepared to include a content requiring the lane change to the adjacent lane from the current lane on which the obstacle exists. The corrected traveling plan also includes settings of the point at which the vehicle is separated from the current lane (that is, a lane change point). When Step S603 is completed, Step S604 is performed.

In Step S604, in cooperation with the HMI system 16, information related to the corrected traveling plan is presented. For example, an image as illustrated in FIG. 4 is displayed to notify the occupant to change the lane to avoid the obstacle. When Step S604 is completed, the process proceeds to Step S605. In Step S605, the lane is changed, and this flow ends.

Hitherto, a configuration has been disclosed in which no particular process is performed when the obstacle lane is not the subject vehicle traveling lane. However, the present disclosure is not limited thereto. When the obstacle exists on the lane adjacent to the subject vehicle lane, there is a high possibility that other vehicles traveling on the obstacle lane may change the lane to the subject vehicle lane. In view of the above-described circumstances, it is preferable to perform a predetermined interruption warning process as follows. When the obstacle exists on the adjacent lane, an inter-vehicle distance between the subject vehicle and a preceding vehicle is set to be longer, and the occupant is notified to be cautious about the interruption from the adjacent lane.

<Regarding Operation of System and Example of Advantageous Effect>

According to the system configuration described above, first, the map cooperation device 50 uploads the obstacle point report while performing the avoidance action is used as a trigger. The map server 2 detects the point where the obstacles exist on the road, based on the information uploaded from the vehicle. The existence of the obstacle is notified to the vehicle scheduled to travel through the point where the obstacle exists. The map cooperation device 50 transmits the vehicle behavior data indicating the behavior of the subject vehicle when the subject vehicle passes through the vicinity of the obstacle registration point notified from the map server 2, to the map server 2.

Here, when the obstacle remains and the subject vehicle travels on the lane on which the obstacle exists, the vehicle behavior data transmitted by the map cooperation device 50 to the map server 2 is data indicating that the avoidance action is performed. Even when the subject vehicle travels on the lane on which the obstacle does not exist, the subject vehicle may be decelerated to avoid a collision with the other vehicle changing the lane to avoid the obstacle. That is, a peculiar behavior which is less likely to occur when the obstacle does not exist, such as sudden deceleration for avoiding a collision with an interruption vehicle, may be observed. On the other hand, when the obstacle has disappeared, the vehicle behavior for avoiding the obstacle or the interruption vehicle is no longer observed. In this way, the vehicle behavior data when the vehicle passes through the vicinity of the obstacle registration point functions as an index indicating whether the obstacle remains.

Therefore, the map server 2 can specify whether the obstacle still remains at the obstacle registration point or has disappeared, based on the vehicle behavior data provided by multiple vehicles. When the disappearance of an obstacle is detected based on the report from the vehicle passing through the obstacle registration point, the vehicle to which the information on the obstacle is distributed is notified of a disappearance of the obstacle.

Figure 23:
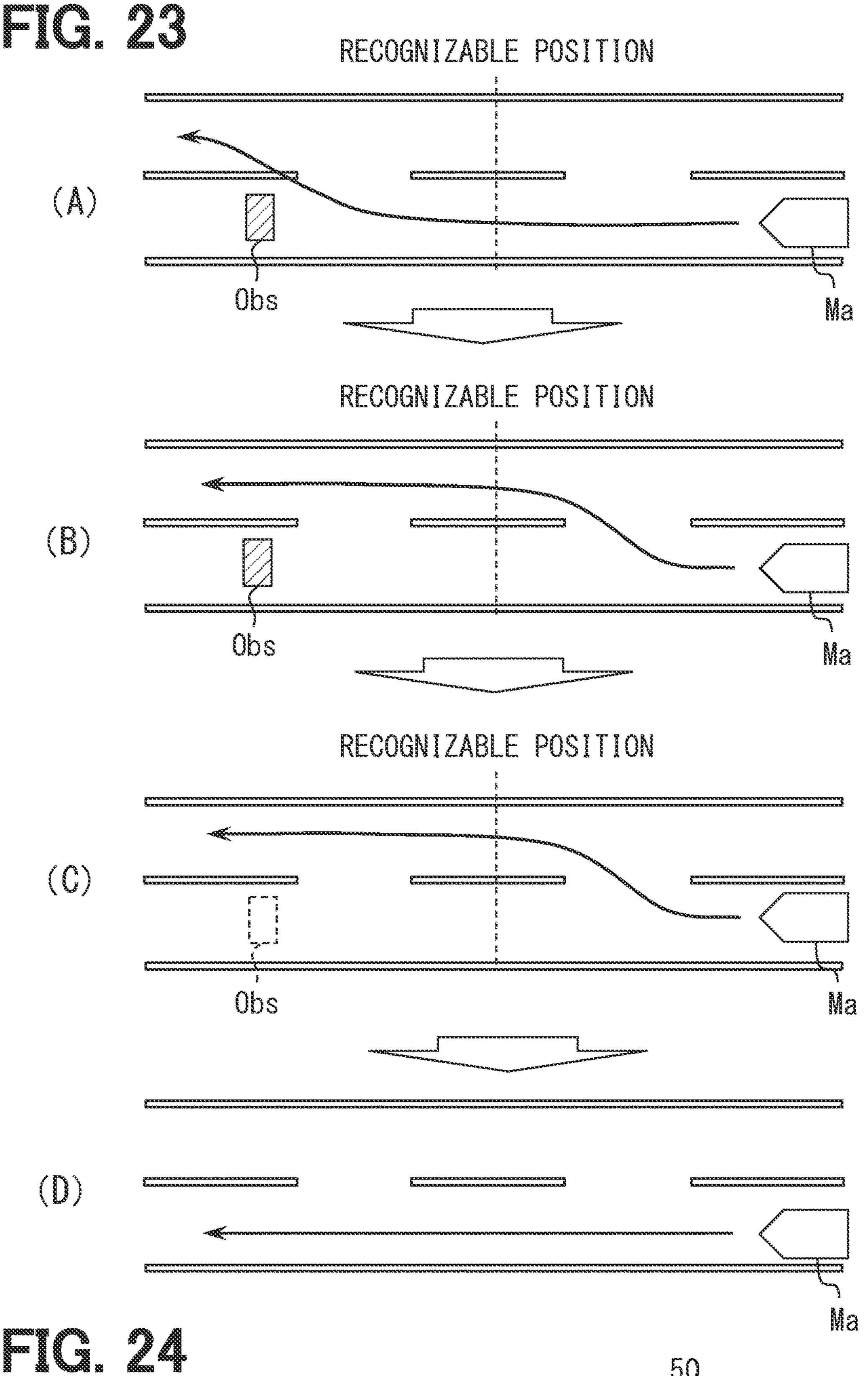
FIG. 23 is a figure describing an advantageous effect of the obstacle information distribution system.

FIG. 23 is a view conceptually illustrating a change in the vehicle behavior depending on the presence or absence of the on-map obstacle information. When the on-map obstacle information does not exist, as illustrated in (A) in FIG. 23, after the vehicle reaches a position where the front camera 11 can recognize the obstacle, the avoidance action such as the lane change is performed. The map server 2 collects these vehicle behaviors. In this manner, the map server 2 detects the existence/appearance of the obstacle, and starts distributing the existence/appearance of the obstacle as the obstacle information. A recognizable position may vary depending on performance of the front camera 11 or the millimeter wave radar 12, and a size of the obstacle. For example, the recognizable position is a point of approximately 100 m to 200 m in front of the obstacle in a good environment such as fine weather.

FIG. 23(B) conceptually illustrates the behavior of the vehicle having the acquired on-map obstacle information. The vehicle acquiring the on-map obstacle information from the map server 2 can change the lane before reaching the recognizable position, as illustrated in FIG. 23(B). That is, it is possible to take measures such as the lane change and a handover with a sufficient time margin in advance.

On the other hand, the obstacle is removed and has disappeared with the lapse of time. In the real world, there is a predetermined time difference (that is, a delay) between when the obstacle has disappeared and when the map server 2 detects the disappearance of the obstacle. Therefore, immediately after the obstacle has disappeared in the real world, as illustrated in FIG. 23(C), even though the obstacle does not actually exist, in some cases, the vehicle changing the lane may pass, based on the on-map obstacle information.

However, the map server 2 of the present embodiment is configured to be capable of acquiring the obstacle point report from the vehicle passing through the vicinity of the obstacle registration point. Therefore, the disappearance of the obstacle can be quickly recognized, based on the obstacle point report. As a result, the disappearance of the obstacle can be quickly distributed to the vehicle, and it is possible to reduce a possibility that the vehicle may unnecessarily change the lane or may perform the handover. FIG. 23(D) illustrates a state after the disappearance of the obstacle is confirmed by the map server 2.

The map server 2 of the present disclosure verifies whether the obstacle truly has disappeared, based on the reports from multiple vehicles and/or from multiple viewpoints. According to this configuration, it is possible to reduce a risk of misdistributing the disappearance of the obstacle even though the obstacle actually exists.

According to the configuration of the present disclosure, when a determination result indicating that the obstacle has disappeared is obtained as an analysis result of the image uploaded from the vehicle, the configuration reduces a threshold value for determining that the obstacle has disappeared with respect to the number of vehicles which do not perform the avoidance actions. For example, when it can be confirmed that the obstacle has disappeared from the analysis result of the image in the server processor 21, it may be determined that the obstacle has disappeared, based on the vehicle behavior information of one to several vehicles. When a determination result indicating disappearance of the obstacle is obtained by performing statistical processing on the obstacle recognition results in multiple vehicles, the configuration reduces a threshold value for determining that the obstacle has disappeared with respect to the number of vehicles which do not perform the avoidance actions. According to this configuration, the determination that the obstacle has disappeared can be more quickly confirmed. As a result, for example, a transition period between FIG. 23(C) and FIG. 23(D) can be shortened. According to the configuration for determining the existence state of the obstacle by combining vehicle behavior and the image analysis, both real-time performance and information reliability can be achieved.

The map server 2 confirms the determination that the obstacle has disappeared, in a requirement condition that the vehicle does not perform the avoidance actions. Since the determination is not made based on the image alone, when the obstacle is not incidentally imaged by the camera, it is possible to reduce a risk of misdetermining disappearance of the obstacle.

In the above-described configuration, not only the fallen object but also the parking vehicle on the general road (street parking vehicle) are detected as the obstacles. The street parking vehicle may exist to block approximately half of the lane, and may interfere with an autonomous driving function and/or a driver-assistance function on the general road. For example, there is a possibility of interrupting services such as autonomous driving when the street parking vehicle blocks the lanes. According to the configuration for distributing the position of the street parking vehicle as described above, the vehicle can perform the handover with a sufficient time margin, or a path where the street parking vehicle does not exist can be adopted.

In the above-described configuration, the appearance and the disappearance of the obstacle is detected, based on the behaviors of multiple vehicles. According to this configuration, compared to the configuration disclosed in Patent Literature 1, it is possible to reduce a risk of misdetermining the presence or absence of the fallen object in rainy weather, at night, or in backlight.

When the fallen object is assumed as the obstacle, it is difficult to determine whether the fallen object is the object that hinders the traveling or whether the fallen object does not need to be avoided, only by using image recognition. Therefore, in the configuration for detecting the obstacle such as the fallen object by using the image recognition only, there is a possibility of detecting and distributing the object which does not need to be avoided by the vehicle as the obstacle. As a result, there is a possibility for the vehicle receiving the notification of the existence of the obstacle to perform the avoidance action such as an unnecessary lane change. The object that hinders the traveling indicates a three-dimensional object such as a brick and a tire. For example, the object which does not need to be avoided indicates a flat trash such as a folded cardboard sheet.

In contrast, in the configuration of the present disclosure, the presence or absence of the obstacle is determined, based on the behaviors of multiple vehicles. When the obstacle which seems like the object existing on the road does not need to be avoided by the vehicle, there is a high possibility that some vehicles among the plurality of vehicles may pass over the object without performing the avoidance action. Therefore, according to the configuration of the present disclosure, it is possible to reduce a possibility of detecting and distributing the flat trash as the obstacle.

Hitherto, while the embodiment of the present disclosure has been described, the present disclosure is not limited to the embodiment described above, and various modification examples to be described below are included in the technical scope of the present disclosure, and can be executed by various changes within a scope not departing from the spirit described below. For example, various modification examples to be described below can be executed in combination as appropriate within a scope that does not cause technical inconsistency. The members having the same functions as those described in the embodiment described above are denoted by the same reference numerals, and the description of the same members will be omitted. When referring to only a part of the configuration, the configuration of the embodiment described above can be applied to other portions.

<Regarding Obstacle Disappearance Determination Processing>

Based on the vehicle condition report, the disappearance determination unit G32 may determine whether a vehicle straightly traveling to the obstacle registration point has appeared, and based on a fact that the vehicle straightly travels on the obstacle registration point, the disappearance determination unit G32 may determine that the obstacle has disappeared. According to this configuration, it is not necessary to transmit the obstacle point report separately from the vehicle condition report. As a result, a vehicle-side process is simplified. That is, in the configuration in which the vehicle condition report is transmitted by each vehicle, the contents of the vehicle condition report can be used as the vehicle behavior data. Therefore, the obstacle point report is an optional element.

<Regarding Determination Criteria of Appearance/Disappearance of Obstacle>

Hitherto, although a configuration in which the in-vehicle system 1 detects the obstacle by using the front camera 11 has been disclosed, the present disclosure is not limited thereto. A configuration may be adopted as follows. The obstacle may be detected by using a lateral camera that images a lateral part of the vehicle or a rear camera that images a rear part of the vehicle. Similarly, a configuration may be adopted as follows. The obstacle may be detected by using a lateral millimeter wave radar that transmits probe waves toward the lateral part of the vehicle or a rear lateral millimeter wave radar that has a detection range of the rear lateral part (in other words, an obliquely rear part).

For example, the in-vehicle system 1 or the map server 2 may determine the presence or absence of the obstacle by using an image of the lateral camera. When the obstacle blocks the lane, the vehicle is expected to change the lane. However, the vehicle does not travel on the obstacle lane after changing the lane. Therefore, the front camera 11 is less likely to image the obstacle. As a result, after the lane change, there is a possibility of determining that the obstacle does not exist. According to the configuration in which the image data of the lateral camera located on the part where the obstacle exists is used to determine the presence or absence of the obstacle, it is possible to reduce a risk of having the obstacle out of sight when the vehicle passes along the lateral part of the obstacle. The lateral camera may be provided on a side mirror for viewing the rear lateral part. The lateral camera and the front camera 11 may be complementarily used. For example, the report data generation unit F5 may be configured to upload the obstacle point report including an image captured by the front camera 11 while approaching the obstacle registration point and an image captured by the lateral camera after the traveling position is changed. The report image may be selected from the images of lateral camera or the rear camera. The images correspond to vehicle outside images captured by the vehicle-mounted cameras that capture vehicle outside images, such as the front camera 11, the lateral camera, and the rear camera.

When the vehicle includes multiple cameras, the cameras used for obstacle recognition and the camera images to be uploaded may be switched according to a surrounding environment of the vehicle. For example, when a forward inter-vehicle distance is smaller than a predetermined threshold value and a rearward inter-vehicle distance is equal to or greater than a predetermined threshold value, instead of the image of the front camera 11, the in-vehicle system 1 or the map server 2 may use the image of the rear camera or the lateral camera as a determination criterion for determining the presence or absence of the obstacle. Similarly, when the preceding vehicle is a large vehicle such as a truck or a fire engine and the following vehicle is a small vehicle such as a light vehicle, the rear camera or the lateral camera may be adopted as the camera used for determining the presence or absence of the obstacle. That is, depending on whether a front view is open, the cameras may be separately used to determine the presence or absence of the obstacle. Similarly in the millimeter wave radar, when multiple millimeter wave radars are provided, the multiple millimeter wave radars may be separately used according to the surrounding environment.

As a device for detecting the obstacle, in addition to the camera and the millimeter wave radar, LiDAR or sonar may be used. The millimeter wave radar, the LiDAR, and the sonar correspond to distance measuring sensors. The map cooperation device 50 may be configured to detect the obstacle by jointly using multiple types of devices. That is, the map cooperation device 50 may detect the obstacle by sensor fusion.

Figure 24:
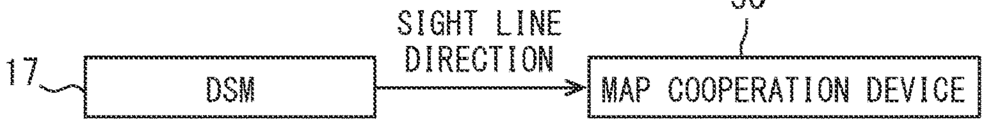
FIG. 24 is a figure describing a configuration in which a sight line of a driver's seat occupant is used as a determination criterion for determining the presence or absence of the obstacle.

The obstacle presence-absence determination unit F51 or the obstacle information management unit G3 may determine the presence or absence of an obstacle, based on an eye movement of the driver's seat occupant which is detected by a driver status monitor (DSM) 17 as illustrated in FIG. 24. The DSM 17 is a device that images a face portion of the driver's seat occupant by using a near-infrared camera, and performs image recognition processing on the captured image. In this manner, the DSM 17 sequentially detects an orientation of the face, a sight line direction, and an opening degree of eyelids of the driver's seat occupant. For example, in order to image the face of the driver's seat occupant, while adopting a posture when the near-infrared camera faces a headrest portion of the driver's seat, the DSM 17 is disposed on an upper surface of a steering column cover, an upper surface of an instrument panel, or in an inner rearview mirror.

For example, when passing along the lateral part of the obstacle, the obstacle presence-absence determination unit F51 or the obstacle information management unit G3 may determine that the obstacle exists, based on a fact that the sight line of the driver's seat occupant is directed in a direction in which it is determined that the obstacle exists. It may be determined that the obstacle has disappeared, based on a fact that the occupant of the vehicle traveling on the lane adjacent to the obstacle no longer looks a direction in which the obstacle exists. That is, the eye movement of the driver's seat occupant when the vehicle passes along the lateral part of the obstacle can also be used as a determination criterion for determining the presence or absence of the obstacle. The in-vehicle system 1 may upload time-series data of sight line direction of the driver's seat occupant when the vehicle passes along the lateral part of the obstacle, as the obstacle point report. The in-vehicle system 1 may upload a determination result related to whether the sight line of the driver's seat occupant is directed to the obstacle registration point when the vehicle passes along the lateral part of the obstacle. The obstacle information management unit G3 may determine whether the obstacle exists, based on sight line information of the occupant.

As it is more difficult to recognize a type of the obstacle, there is a higher possibility that the obstacle may attract people's attention. Therefore, according to the above-described method, there is an advantage in that an object which is less likely to be determined as the obstacle by image recognition can be easily detected as the obstacle. Even when the obstacle is a parked large vehicle, the driver's seat occupant can be expected to direct the sight line toward the parking vehicle to confirm whether a person jumps out of the shadow of the parking vehicle. That is, according to the above-described configuration, detection accuracy in detecting the parking vehicle as the obstacle can be improved.

Alternatively, the map cooperation device 50 may change contents or formats of the obstacle point report to be uploaded according to the type of the detected obstacle. For example, when the obstacle is a point-like object such as the fallen object, position information, a type, a size, and a color are uploaded. On the other hand, when the obstacle is an area event having a predetermined length in a road extending direction, such as lane regulations or construction works, start end and terminal end positions of the obstacle section and the type of the obstacle may be uploaded.

The map cooperation device 50 may upload the behavior of surrounding vehicle to the map server 2 as the determination criterion for determining whether the obstacle exists. For example, when the preceding vehicle also changes the lane, the behavior data of the preceding vehicle may be uploaded to the map server 2 together with the subject vehicle behavior. Specifically, the front camera 11 may generate data of the offset amount of the vehicle traveling ahead with respect to the lane center, may determine whether the vehicle has changed lanes in front of the obstacle registration point, and may transmit the obstacle point report including the determination result.

The behavior of the surrounding vehicle can be specified, based on an input signal from the surrounding monitoring sensor. More specifically, the behavior of the surrounding vehicle can be specified by using a technique such as simultaneous localization and mapping (SLAM). The behavior of the surrounding vehicle may be specified, based on received data received via inter-vehicle communication. Not only the preceding vehicle, whether the following vehicle has changed lanes may also be uploaded. Not only the lane change, the behavior of the surrounding vehicle to be uploaded may also be a change in the traveling position within the same lane. Interruption from the adjacent lane may be uploaded as an index indicating that the obstacle exists on the adjacent lane. A configuration for acquiring the behavior of other vehicles traveling around the subject vehicle, based on signals from the inter-vehicle communication or the surrounding monitoring sensor also corresponds to a vehicle behavior detection unit. Data indicating the behavior of the surrounding vehicle corresponds to other vehicle behavior data. Hereinafter, the vehicle behavior data regarding the subject vehicle will also be referred to as subject vehicle behavior data in order to distinguish subject vehicle behavior data from the other vehicle behavior data.

Incidentally, when an equipped vehicle which is a vehicle equipped with the map cooperation device 50 can acquire the obstacle information from the map server 2, it is assumed as follows. The equipped vehicle changes the lane to a lane having no obstacle in advance, and thereafter, passes along the lateral part of the obstacle. Therefore, in a state where the map server 2 recognizes that the obstacle exists at a certain point, the equipped vehicle is less likely to perform the avoidance action in the vicinity of the obstacle registration point. A vehicle which performs the avoidance action immediately before the obstacle registration point can be a non-equipped vehicle which is not equipped with the map cooperation device 50 at most. Of course, even after the obstacle information starts to be distributed, the equipped vehicle may also show the behavior indicating the existence of the obstacle, for example, such as deceleration resulting from the interruption of the non-equipped vehicle. However, deceleration with respect to the interruption vehicle is not always performed. After the information indicating that the obstacle exists at a certain point starts to be distributed, usability of the subject vehicle behavior data of the equipped vehicle at the point is relatively lower than usability before the information starts to be distributed.

Based on the above-described circumstances, when the vehicle passes through the obstacle registration point, as the obstacle point report, the map cooperation device 50 is configured to transmit the behavior data of the surrounding vehicles (that is, the other vehicle behavior data) or the detection result of the surrounding monitoring sensor in preference to the subject vehicle behavior data. For example, when the vehicle passes through the obstacle registration point, the map cooperation device 50 may be configured to transmit at least one of the other vehicle behavior data and the detection result of the surrounding monitoring sensor without transmitting the subject vehicle behavior data. Here, it is preferable that the surrounding vehicle serving as a report target is the other vehicle traveling on the obstacle lane. The reason is shown as below. The obstacle lane is most likely to be affected by the obstacle, and is highly useful as an index indicating whether the obstacle remains. According to the above-described configuration, with regard to detecting the disappearance of the obstacle, it is possible to restrict uploading of less useful information. More useful information can be preferentially collected in the map server 2 when the disappearance of the obstacle is detected.

Even when the vehicle approaches the obstacle registration point, the obstacle lane may be adopted as the subject vehicle traveling lane, based on an instruction of a driver. When the subject vehicle traveling lane is the obstacle lane at a determination point located by the predetermined distance in front of the obstacle registration point, the map cooperation device 50 may be configured to upload the subject vehicle behavior data in preference to the behavior data of the surrounding vehicle. Whereas the map cooperation device 50 may transmit a data set including the subject vehicle behavior data as the obstacle point report when the subject vehicle traveling lane at the determination point is the obstacle lane, the map cooperation device 50 may transmit a data set which does not include the subject vehicle behavior data when the subject vehicle traveling lane is not the obstacle lane. For example, the determination point can be set at a subject vehicle-side point located by a report target distance from the obstacle registration point.

When the subject vehicle traveling lane at the determination point is not the obstacle lane, the map cooperation device 50 may be configured to reduce an information amount of the subject vehicle behavior data included in the obstacle point report transmitted when the vehicle passes through the vicinity of the obstacle registration point, compared to the information amount of the subject vehicle behavior data when the subject vehicle traveling lane is the obstacle lane. For example, reducing the information amount of the subject vehicle behavior data can be realized by lengthening a sampling interval or reducing the number of items to be transmitted as the subject vehicle behavior data. An aspect of reducing the information amount of the subject vehicle behavior data included in the obstacle point report includes a case where the obstacle point report does not include the subject vehicle behavior data at all.

The map cooperation device 50 may be configured to change contents of the data set to be transmitted to the map server 2, when the obstacle which is not notified from the map server 2 is found, or when the vehicle passes through the received obstacle registration point. For convenience, a data set as the obstacle point report transmitted when the obstacle which is not notified from the map server 2 is found will also be referred to as an unregistered point report. A data set as the obstacle point report transmitted to the map server 2 when the vehicle passes through the vicinity of the obstacle notified from the map server 2 will also be referred to as a registered point report. For example, whereas the unregistered point report is a data set including the subject vehicle behavior data and input data from the surrounding monitoring sensor, the registered point report is a data set including the other vehicle behavior data and input data from the surrounding monitoring sensor. For example, the registered point report can be a data set in which the size of the subject vehicle behavior data is reduced to be equal to or smaller than half of the size of the unregistered point report. According to this configuration, information corresponding to respective characteristics of the appearance determination and the disappearance determination of the obstacle can be efficiently collected in the map server 2.

In the configuration for uploading the behavior of the surrounding vehicle, there is a possibility that the behavior of the same vehicle may be reported to the map server 2 multiple times. In order to prevent counting the same vehicle multiple times by the map server 2, it is preferable to upload the behaviors of the subject vehicle and the surrounding vehicle in association with each vehicle ID. The vehicle ID of the surrounding vehicle may be acquired via inter-vehicle communication, or may be acquired by image recognition of a license plate.

<Regarding Calculation of Detection Reliability of Map Cooperation Device 50>

Figures 25, 26:
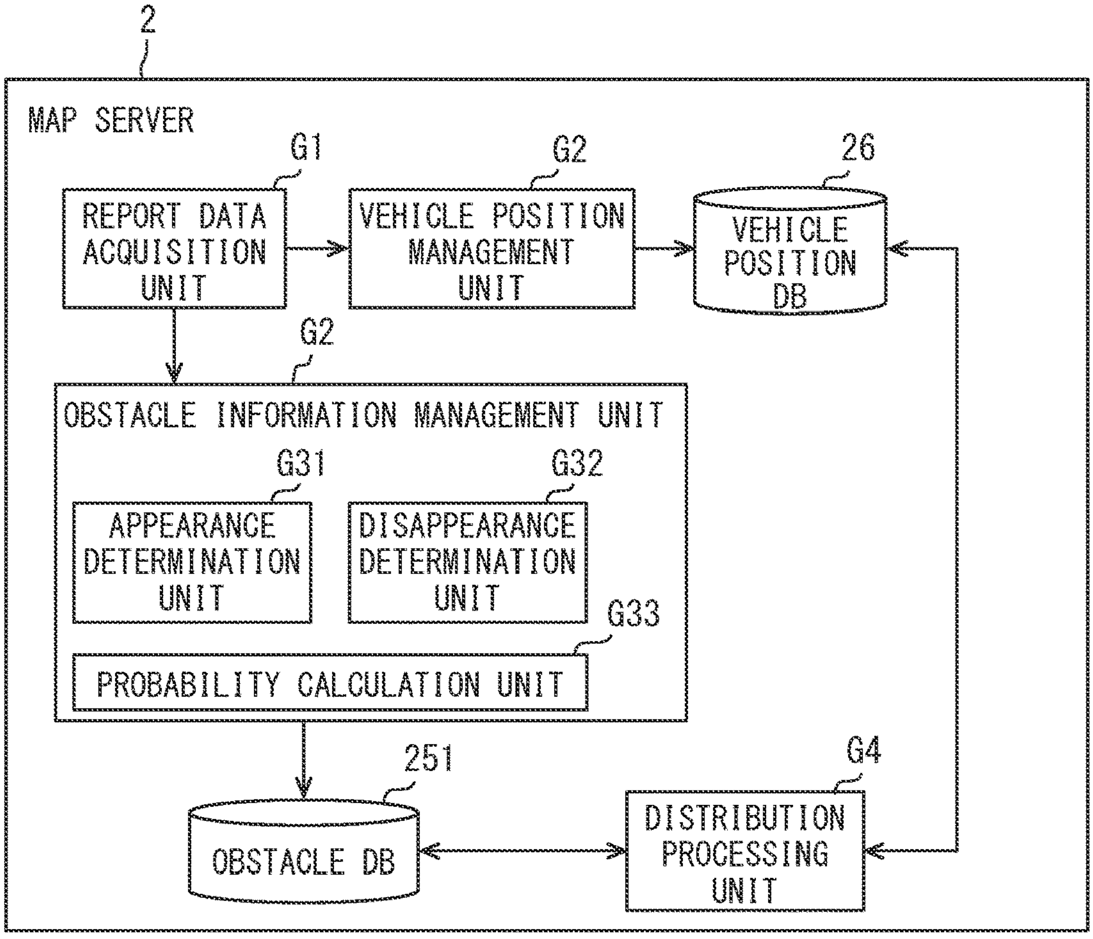
FIG. 25 is a figure illustrating an example of a reference when an obstacle presence-absence determination unit calculates detection reliability.
FIG. 26 is a figure illustrating a modification example of the map server.

The obstacle presence-absence determination unit F51 may calculate a possibility of actual existence of the obstacle as detection reliability, based on a combination of whether the obstacle is detected by the front camera 11, whether the obstacle is detected by the millimeter wave radar 12, and whether the avoidance action is performed. For example, as illustrated in FIG. 25, a configuration may be adopted as follows. As a viewpoints (sensors or behaviors) indicating the existence of the obstacle increase, the possibility is calculated to have higher detection reliability. An aspect of determining the detection reliability illustrated in FIG. 25 is an example, and can be changed as appropriate.

The vehicle behavior in FIG. 25 indicates the avoidance action of the subject vehicle when the obstacle exists in front of the subject vehicle on the traveling lane. When the obstacle exists on the adjacent lane, the behavior of the surrounding vehicle traveling on the obstacle lane can be substituted for calculating the detection reliability. For example, the presence or absence of the interruption from the obstacle lane into the subject vehicle traveling lane can be used as a viewpoint for calculating the detection reliability. When there is the interruption from the obstacle lane into the subject vehicle traveling lane, it is expected that a flow of the vehicle in the subject vehicle traveling lane is delayed.

Therefore, when the vehicle travels on the lane adjacent to the obstacle lane, and when the traveling speed of the subject vehicle is reduced in front of the obstacle registration point, it may be determined that the surrounding vehicle performs the avoidance action.

The obstacle point report may include the detection reliability calculated by the obstacle presence-absence determination unit F51. The map server 2 may determine whether the obstacle exists by performing statistical processing on the detection reliability included in the reports from multiple vehicles. The detection reliability may be evaluated by jointly using sight line information of the occupant which is detected by the DSM. For example, when the sight line of the driver's seat occupant is directed in a direction in which the obstacle is determined to exist while the vehicle passes along the lateral part of the obstacle, the detection reliability may be set to be higher.

The above-described detection reliability indicates the reliability of the report indicating that the obstacle exists. Therefore, the above-described detection reliability can also be called existence report reliability. As non-detection reliability, the obstacle presence-absence determination unit F51 may calculate a possibility that the obstacle may not exist, based on a combination of whether the obstacle is detected by the front camera 11, whether the obstacle is detected by the millimeter wave radar 12, and whether the avoidance action is performed. The non-detection reliability corresponds to a reverse meaning of the above-described detection reliability. As the detection reliability is higher, the non-detection reliability may be set to be lower. The non-detection reliability indicates the reliability of the report indicating that the obstacle does not exist. Therefore, the above-described non-detection reliability can also be called non-existence report reliability.

<Regarding Calculation of Actual Existence Probability in Map Server 2>

The map server 2 may be configured to calculate and distribute a possibility that the obstacle may exist, as actual existence probability. The actual existence probability corresponds to the determination result indicating that the obstacle exists and the reliability of the distribution information. For example, as illustrated in FIG. 26, the obstacle information management unit G3 may include a probability calculation unit G33 that calculates the reliability of the determination result indicating that the obstacle exists, as the actual existence probability.

Figure 27:
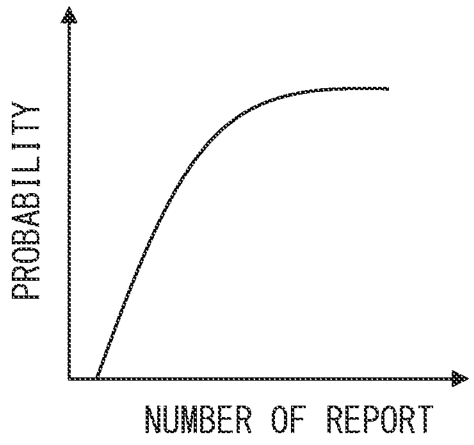
FIG. 27 is a figure conceptually illustrating an example of a rule for calculating statistical reliability calculated by the map server.

The probability calculation unit G33 calculates the actual existence probability, based on a ratio of the vehicles already performed the avoidance actions with reference to the behavior data of multiple vehicles. For example, as illustrated in FIG. 27, the probability calculation unit G33 sets the actual existence probability to be higher, as the number of vehicles reporting the existence of the obstacle increases. For example, in addition to the vehicles already performed the avoidance actions, the vehicles reporting the existence of the obstacle include the vehicles having uploaded detection obstacle information, which are the vehicles traveling on the adjacent lane of the obstacle lane. The probability calculation unit G33 may calculate the actual existence probability in accordance with the number and the type of the reports indicating the existence of the obstacle, when the existence of the obstacle can be confirmed by the image analysis of the server processor 21 or a visual observation of an operator is set to 100. For example, as the number of vehicles already performed the avoidance actions increases or as the number of vehicles having detected the obstacle by the surrounding monitoring sensors increases, the actual existence probability may be set to be higher.

The probability calculation unit G33 may calculate the actual existence probability, based on a difference between the number of reports indicating that the obstacle exists and the number of reports indicating that the obstacle does not exist. For example, when the number of reports indicating that the obstacle exists and the number of reports indicating that the obstacle does not exist are the same as each other, the actual existence probability may be set to 50%. The probability calculation unit G33 may calculate the actual existence probability by performing the statistical processing on the detection reliability included in the reports from multiple vehicles. The probability calculation unit G33 may periodically calculate the actual existence probability.

The distribution processing unit G4 may distribute the obstacle notification packet including the above-described actual existence probability. When the actual existence probability of the obstacle at a certain point is changed, the distribution processing unit G4 may distribute the obstacle notification packet including the updated actual existence probability to the vehicle to which the obstacle notification packet for the point is distributed. For example, the distribution processing unit G4 may periodically distribute the obstacle notification packet together with the information including a probability that the obstacle exists. For example, the obstacle notification packet may be distributed at a prescribed interval by indicating the actual existence probability in three stages such as "still exists", "high possibility of still existing", and "high possibility of disappearance".

Incidentally, a value obtained by subtracting the actual existence probability from 100% corresponds to a disappearance probability indicating a probability that the obstacle has disappeared. The distribution processing unit G4 may transmit a disappearance notification packet including the disappearance probability of the obstacle. A configuration may be adopted as follows. A person (for example, a worker) or a vehicle removing the obstacle can transmit a report indicating that the obstacle is removed to the map server 2. When the map server 2 receives the report indicating that the obstacle is removed from the worker, the map server 2 may immediately distribute the disappearance notification packet in which the disappearance probability is set to be higher.

<Distribution Aspect of Obstacle Information>

It is preferable that the obstacle notification packet includes the position, the type, and the size of the obstacle. The position information of the obstacle may include not only the position coordinates but also the lateral position of the end portion of the obstacle as a detailed position inside the lane. The obstacle notification packet may include width information of a region in which the vehicle can travel on the obstacle lane, excluding a portion blocked by the obstacle.

According to the configuration in which the obstacle notification packet includes the lateral position information of the end portion of the obstacle or the width in which the vehicle can travel on the obstacle lane, the vehicle receiving the obstacle notification packet can determine whether the lane change is required or whether the vehicle can avoid the obstacle by adjusting the lateral position. Even when the vehicle travels across the lane boundary, it is possible to calculate a protrusion amount protruding to the adjacent lane. When it is possible to calculate the protrusion amount to the adjacent lane to avoid the obstacle, the protrusion amount of the subject vehicle to the vehicle traveling in the adjacent lane can be notified via inter-vehicle communication, and the subject vehicle can cooperate with the surrounding vehicle for the traveling position.

The obstacle notification packet may include time information when it is determined that the obstacle has appeared and a latest (in other words, last) time when it is determined that the obstacle still exists. Since the determination times are included, the vehicle receiving the information can estimate reliability of the received information. For example, as the elapsed time from the final determination time is shorter, the reliability is higher. The obstacle notification packet may include information on the number of vehicles confirming the existence of the obstacle. The higher reliability of the obstacle information can be estimated, as the number of vehicles confirming the existence of the obstacle increases. Depending on whether the reliability of the obstacle information is high, a control aspect in the vehicle may be changed, with regard to whether the obstacle information is used for vehicle control or is used only for notification to the occupant.

The obstacle notification packet may include colors or characteristics of the obstacle. The obstacle notification packet may include an image of the obstacle imaged by a certain vehicle. According to the configuration, the in-vehicle system 1 or the occupant scheduled to pass through the obstacle registration point can easily associate the obstacle notified from the map server 2 with the obstacle in the real world. As a result, determination accuracy in determining whether the obstacle notified from the map server 2 still exists or has disappeared is improved.

The distribution processing unit G4 may distribute the information by setting a lane change recommendation POI (Point of Interest) to a point in front of the obstacle registration point by the predetermined distance in the obstacle lane. The lane change recommendation POI indicates a point where the lane change is recommended. According to the configuration in which the map server 2 sets and distributes the lane change recommendation POI in this way, a process for calculating the lane change point of the vehicle can be omitted, and a processing load on the processing unit 51 or the driver-assistance ECU 60 can be reduced. Even in the configuration which proposes the lane change to the user, a timing for displaying an obstacle notification image can be determined by using the lane change recommendation POI.

The obstacle notification packet may include information indicating whether the place still remains at risk, such as whether the obstacle has disappeared or whether the obstacle is moved. Whether the place still remains at risk may be expressed by the above-described actual existence probability. As in the obstacle notification packet, it is preferable that the obstacle disappearance packet also includes the characteristics of the obstacle or the time at which the disappearance is determined.

The distribution processing unit G4 may be configured to distribute the obstacle notification packet only to a vehicle in which a predetermined application such as an autonomous driving application is executed. As the predetermined application, in addition to the autonomous driving application, adaptive cruise control (ACC), lane trace control (LTC), or a navigation application can be adopted. In the configuration for pull-based distribution of the obstacle information, the map cooperation device 50 may be configured to request the map server 2 for the obstacle information in a condition that a specific application is executed. According to the above-described configuration, stability in control of the driver-assistance ECU 60 can be improved while excessive information distribution is restricted. The distribution processing unit G4 may be configured to perform push-based distribution of the obstacle notification packet, only on a vehicle which is set to automatically receive the obstacle information, based on settings of the user. According to this configuration, it is possible to reduce a possibility of communication between the map server 2 and the map cooperation device 50 with each other via wireless communication against an intention of the user. The distribution processing unit G4 may distribute the obstacle information in units of mesh/map tiles. For example, the obstacle information on the map tile may be distributed to a vehicle existing on the map tile or a vehicle requesting a map of the map tile. From one viewpoint, the configuration corresponds to a configuration in which the obstacle notification packet is distributed in units of map tiles. According to this configuration, a distribution target can be simply selected, and information on multiple obstacle registration points can be collectively distributed. As a result, a processing load on the map server 2 can be reduced. A method for using the received obstacle information depends on which type of applications is activated in the in-vehicle system 1. According to the above-described configuration, the obstacle information can be used in a more diversified and flexible manner in the in-vehicle system 1.

<Regarding Upload Processing in Map Cooperation Device 50>

The map cooperation device 50 may be configured to transmit the obstacle point report, only when the content registered in the map and the content observed by the vehicle are different from each other as the obstacle information. In other words, a configuration may be adopted as follows. When the content of the map and the actual status coincide with each other, the obstacle point report may not be transmitted. For example, when the obstacle is observed at a point where the existence of the obstacle is not registered on the map, or when the obstacle does not exist at a point where the existence of the obstacle is registered on the map, the obstacle point report is transmitted. According to the above-described configuration, the amount of communication can be reduced. The server processor 21 may not perform a determination processing related to the presence or absence of the obstacle for portions where the real world and the map registration contents coincide with each other. That is, a processing load on the server processor 21 can also be reduced.

Hitherto, a configuration has been disclosed as follows. The map cooperation device 50 voluntarily uploads the vehicle behavior data to the map server 2 when the vehicle passes through the vicinity of the obstacle. However, a configuration of the map cooperation device 50 is not limited thereto. As another aspect, it is conceivable to adopt a configuration as follows. The map cooperation device 50 may upload the vehicle behavior data to the map server 2 only when there is a predetermined movement such as the lane change and the sudden deceleration. In the configuration in which the vehicle behavior data is uploaded only when each vehicle shows a specific movement, there is a possibility that information for determining whether the obstacle has disappeared may be less likely to be collected in the map server 2. The reason is shown as below. When the obstacle has disappeared, the vehicle no longer shows the specific movement.

Based on the above-described possibility, the server processor 21 may transmit an upload instruction signal, which is a control signal instructing to upload the obstacle point report, to the vehicle passing and/or scheduled to pass through the obstacle registration point. In other words, the map cooperation device 50 may be configured to determine whether to upload the obstacle point report, based on an instruction from the map server 2. According to this configuration, an upload status of the obstacle point report can be controlled by each vehicle, based on the determination of the map server 2, and unnecessary communication can be restricted. For example, when information on the appearance or the disappearance of the obstacle is sufficiently collected, measures such as restricting the upload from vehicle can be adopted.

The server processor 21 may set a point where the vehicle behavior indicating the existence of the obstacle is observed based on the vehicle condition report, as a verification point, and may transmit an upload instruction signal to the vehicle scheduled to pass through the verification point. For example, the point where the vehicle behavior indicating the existence of the obstacle is observed is a point where two or three vehicles consecutively changed lanes. According to the configuration, it is possible to intensively and quickly collect information on a point where the obstacle is suspected to exist, and it is possible to detect the existence state of the obstacle on a real-time basis.

A configuration may be adopted in which whether to upload the obstacle point report can be set in the vehicle. For example, a configuration may be adopted in which the user can set whether to upload the obstacle point report via an input device. Furthermore, a configuration may be adopted in which the user can change settings of information items uploaded as the obstacle point report. According to this configuration, it is possible to reduce a possibility of increasing the amount of communication by the user who unintentionally uploads the vehicle behavior data to the map server 2. From a viewpoint of privacy protection, a configuration may be adopted as follows. The transmission source information may be rewritten to a number different from the actual vehicle ID by using a predetermined encryption code, and may be uploaded to the map server 2.

The obstacle information distribution system 100 may be configured to grant an incentive for the user who positively uploads information on the obstacle. Since the incentive is granted in transmitting the obstacle point report, the information related to the obstacle can be more easily collected, and effectiveness of the obstacle information distribution system 100 can be improved. The incentive can be granted for a decrease in automobile-related taxes, a decrease in usage fees for map services, and points that can be used to purchase goods or to use services. A concept of electronic money is also included in the points that can be used to purchase predetermined goods or to use services.

<Example of Application to Autonomous Driving>

For example, the obstacle information generated by the map server 2 may be used to determine whether to perform autonomous driving. As a road condition for the autonomous driving, a configuration may be adopted in which the number of lanes is regulated to be equal to or more than a predetermined number n. The predetermined number n is an integer equal to or greater than "2", and for example, is "2", "3", or "4". In this configuration, a section where the number of available lanes is less than n due to the obstacles on the road such as fallen objects, construction sections, and street parking vehicles may be an autonomous driving unavailable section. The number of available lanes is the number of lanes on which the vehicle can substantially travel. For example, when one lane in a two-lane road on each side is blocked by the obstacle on the road, the number of available lanes of the road is "1".

Figure 28:
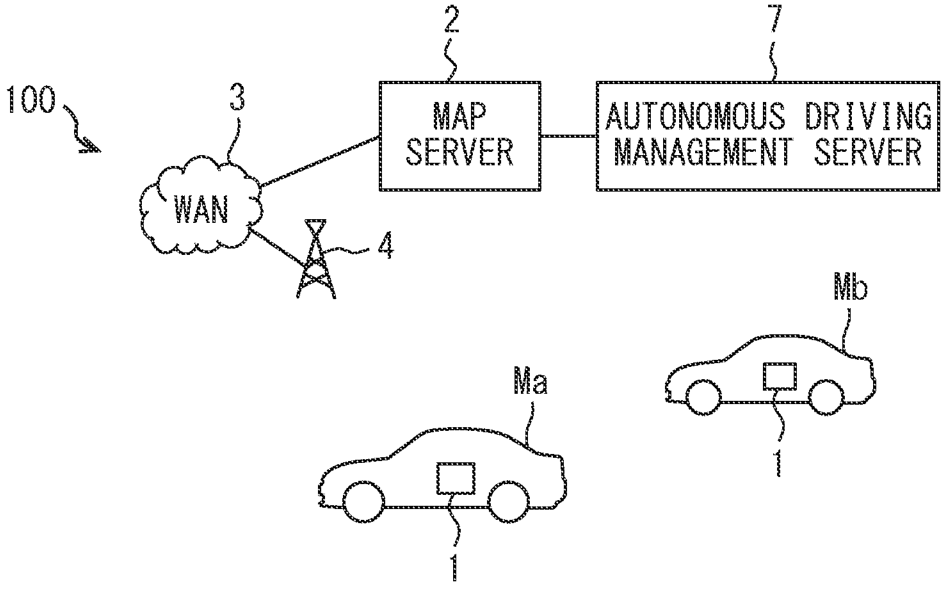
FIG. 28 is a figure illustrating a configuration of a system for dynamically setting an autonomous driving unavailable section, based on the obstacle information.

For example, a configuration may be adopted as follows. Whether the lane corresponds to the autonomous driving unavailable section may be determined by an in-vehicle device such as the driver-assistance ECU 60 and the autonomous driving ECU. The map server 2 may set the autonomous driving unavailable section, based on the obstacle information, and may distribute the autonomous driving unavailable section. For example, in the map server 2, a section where the number of available lanes is insufficient due to the obstacle on the road is set as the autonomous driving unavailable section, and the autonomous driving unavailable section is distributed. When it is confirmed that the obstacle on the road has disappeared, the autonomous driving unavailable setting is canceled, and the cancellation is distributed. As illustrated in FIG. 28, a server for distributing the setting of the autonomous driving unavailable section may be provided separately from the map server 2 as an autonomous driving management server 7. The autonomous driving management server corresponds to a server for managing autonomous driving available/unavailable sections. As described above, the obstacle information can be used to determine whether an operational design domain (ODD) set for each vehicle is satisfied. As illustrated in FIG. 28, a system for distributing information related to whether the autonomous driving is available to vehicle, based on the obstacle information on the road will be referred to as an autonomous driving unavailable section distribution system.

<Appendix (1)>

The control unit and the method which are described in the present disclosure may be realized by a dedicated computer constituting a processor programmed to execute one or multiple functions embodied by a computer program. The device and the method which are described in the present disclosure may be realized by a dedicated hardware logic circuit. The device and the method which are described in the present disclosure may be realized by one or more dedicated computers configured by a combination of a processor that executes a computer program and one or more hardware logic circuits. The computer program may be stored in a computer-readable non-transitional tangible recording medium as an instruction executed by a computer. For example, means and/or functions provided by the map cooperation device 50 and the map server 2 can be provided by software recorded in a physical memory device, a computer executing the software, only software, only hardware, or a combination thereof. Some or all of the functions provided by the map cooperation device 50 and the map server 2 may be realized as hardware. An aspect in which a certain function is realized as hardware includes an aspect in which the function is realized by using one or multiple ICs. For example, the server processor 21 may be realized by using an MPU or a GPU instead of the CPU. The server processor 21 may be realized by combining multiple types of calculation processing devices such as the CPU, the MPU, and the GPU. Furthermore, the ECU may be realized by using a field-programmable gate array (FPGA) or an application specific integrated circuit (ASIC). The same applies to the processing unit 51. Various programs may be stored in a non-transitory tangible storage medium. Various storage media, such as a hard-disk drive (HDD), a solid state drive (SSD), an erasable programmable rom (EPROM), a flash memory, a USB memory, and a secure digital (SD) memory card, can be adopted as a storage medium of the program.

<Appendix (2)>

The present disclosure also includes the following configurations.

The map server is configured in which at least one of the appearance determination unit and the disappearance determination unit determines whether the obstacle exists by using the camera image captured by the vehicle in addition to the vehicle behavior data of the multiple vehicles.

The map server is configured to change a combination of information types for determining that the obstacle exists, when the appearance of the obstacle is determined and when the disappearance of the obstacle is determined.

The map server is configured not to use the analysis result of the image captured by the vehicle-mounted camera when the disappearance is determined, while the analysis result of the image captured by the vehicle-mounted camera is jointly used when the appearance is determined.

The map server is configured to change the weight of each information type for determining that the obstacle exists, when the appearance of the obstacle is determined and when the disappearance of the obstacle is determined.

As a determination criterion for determining whether the obstacle exists, the map server is configured to reduce the weight of the analysis result of the image when the disappearance is determined, compared to when the appearance is determined, in the configuration using the analysis result of the image captured by the vehicle-mounted camera.

The map server is configured to determine the appearance and the disappearance of the obstacle by comparing the traffic volume on each lane.

The map server is configured to adopt the lane change performed after deceleration as the avoidance action. According to the configuration, it is possible to exclude the lane change for overtaking.

The obstacle presence-absence determination device or the map server that does not determine the existence of the obstacle, when a distance measuring sensor does not detect a three-dimensional object, even when the obstacle is detected by the camera.

A map server that does not distribute the information on the obstacle to a vehicle traveling and/or scheduled to travel on a lane which is not adjacent to the lane on which the obstacle exists, in other words, a lane separated by one or more lanes.

The map cooperation device serving as the vehicle device is configured to upload the obstacle point report including the vehicle behavior to the map server, voluntarily or based on the instruction from the map server, when the vehicle travels within a certain range from the obstacle registration point notified from the map server.

The map cooperation device serving as the vehicle device transmits the obstacle point report indicating that the obstacle does not exist, when the vehicle passes through a point notified from the map server that the obstacle exists, in a case where the notified obstacle cannot be detected, based on the input signal from the surrounding monitoring sensor.

The map cooperation device outputs the obstacle information acquired from the map server to the navigation device or the autonomous driving device.

The HMI system causes the display to display the obstacle notification image generated based on the obstacle information acquired from the map server. The HMI system does not notify the occupant of the information on the obstacle, when the vehicle travels and/or scheduled to travel on a lane which is not adjacent to the lane on which the obstacle exists, in other words, on a lane separated by one or more lanes.

The driver-assistance device is configured to switch between whether to perform the vehicle control, based on the information and whether to use the actual existence probability only for information presentation, based on the actual existence probability of the obstacle notified from the map server.

The invention claimed is:

1. An obstacle information management device, comprising:

a vehicle behavior acquisition unit that is configured to acquire vehicle behavior data indicative of behaviors of a plurality of vehicles in association with position information;

an appearance determination unit that is configured to specify a point, as an obstacle registration point, where an obstacle has appeared based on the vehicle behavior data acquired by the vehicle behavior acquisition unit;

a disappearance determination unit that is configured to determine, based on the vehicle behavior data acquired by the vehicle behavior acquisition unit, whether the obstacle remains or has disappeared at the obstacle registration point where the obstacle was determined to exist by the appearance determination unit;

a distribution processing unit that is configured to distribute information on the obstacle to the vehicles; and a probability calculation unit that is configured to calculate an actual existence probability indicative of a degree of possibility that the obstacle exists at the obstacle registration point, wherein the distribution processing unit is configured to distribute an obstacle notification packet which is a communication packet indicative of the information on the obstacle to the vehicles that are scheduled to pass through the obstacle registration point, and the obstacle notification packet includes the actual existence probability calculated by the probability calculation unit.

2. The obstacle information management device according to claim 1, wherein each of the disappearance determination unit and the appearance determination unit is configured to determine whether each of the vehicles performs a predetermined avoidance action based on the vehicle behavior data, the appearance determination unit is configured to determine that the obstacle exists at a point when at least one of the vehicles is determined to perform the avoidance action near the point, and the disappearance determination unit is configured to detect disappearance of the obstacle when at least one of the vehicles travelling near the obstacle registration point do not perform the avoidance action.

3. The obstacle information management device according to claim 2, wherein the appearance determination unit and the disappearance determination unit have different criteria to determine existence of the obstacle.

4. The obstacle information management device according to claim 2, wherein an image obtained by capturing a point where the obstacle exists is acquired from each of the vehicles, the disappearance determination unit is configured to determine, at the obstacle registration point, that the obstacle has disappeared when a number or a ratio of the vehicles which do not perform the avoidance action exceeds a threshold value, and the threshold value for determining disappearance of the obstacle varies based on whether the obstacle is shown in the image.

5. The obstacle information management device according to claim 1, wherein the vehicle behavior acquisition unit is configured to acquire, as the vehicle behavior data, not only behavior data regarding the vehicles serving as transmission sources but also behavior data of a surrounding vehicle around the transmission sources, and the disappearance determination unit is configured to determine disappearance of the obstacle based on behaviors of the vehicles serving as the transmission sources and the surrounding vehicle.

6. The obstacle information management device according to claim 1, wherein the obstacle information management device is configured to instruct the vehicles that are scheduled to pass through the obstacle registration point to transmit information to determine a status of the obstacle together with the vehicle behavior data.

7. The obstacle information management device according to claim 1, wherein the distribution processing unit is configured to, when the disappearance determination unit determines that the obstacle has disappeared, distribute a disappearance notification packet, which is a communication packet indicating that the obstacle has disappeared, to the vehicles to which the obstacle notification packet regarding the disappeared obstacle has been distributed.

8. The obstacle information management device according to claim 7, wherein the obstacle notification packet includes information indicative of a position of the obstacle and information indicative of characteristics of the obstacle, and the information indicative of the characteristics of the obstacle includes at least one of a type, a size, and a color of the obstacle.

9. The obstacle information management device according to claim 7, wherein the obstacle notification packet includes, as the information indicative of the position of the obstacle, at least one of a number of a lane on which the obstacle exists and a lateral position of an end portion of the obstacle in the lane.

10. The obstacle information management device according to claim 1, wherein the probability calculation unit is configured to periodically calculate the actual existence probability for the obstacle registration point, and the distribution processing unit is configured to re-distribute the obstacle notification packet when the actual existence probability calculated by the probability calculation unit changes.

11. The obstacle information management device according to claim 1, wherein the appearance determination unit is configured to make a determination based on information acquired within a predetermined first time period, the disappearance determination unit is configured to make a determination based on information acquired within a predetermined second time period, and each of the first time period and the second time period is equal to or less than 90 minutes.

12. The obstacle information management device according to claim 1, wherein the disappearance determination unit is configured to determine whether the obstacle has disappeared by weighting, according to freshness of the vehicle behavior data, the vehicle behavior data received from the plurality of vehicles.

13. The obstacle information management device according to claim 1, wherein the appearance determination unit is configured to wirelessly acquire, from each of the vehicles, a vehicle outside image captured within a prescribed time period from a time point if each of the vehicles performed a predetermined avoidance action for avoiding the obstacle, the appearance determination unit is configured to determine presence or absence of the obstacle and a type of the obstacle by analyzing a portion of the vehicle outside image, and the portion of the image is determined according to an avoidance direction of the vehicle.

14. An obstacle information management method for managing position information of an obstacle existing on a road, the method, executed by at least one processor, comprising:

acquiring vehicle behavior data indicative of a vehicle behavior of each of a plurality of vehicles in association with each point;

specifying a point, as an obstacle registration point, where the obstacle has appeared based on the acquired vehicle behavior data;

determining, based on the acquired vehicle behavior data, whether the obstacle remains or has disappeared at the obstacle registration point where the obstacle is determined to exist;

calculating an actual existence probability indicative of a degree of possibility that the obstacle exists at the obstacle registration point; and distributing an obstacle notification packet which is a communication packet indicative of the information on the obstacle to the vehicles that are scheduled to pass through the obstacle registration point, wherein the obstacle notification packet includes the calculated actual existence probability.

15. A vehicle device for transmitting information on a point of an obstacle existing on a road to a predetermined server, the vehicle device comprising:

an obstacle point information acquisition unit that is configured to acquire, by communicating with the server, information on an obstacle registration point where the obstacle is determined to exists;

a vehicle behavior detection unit that is configured to detect a behavior of at least one of a subject vehicle and another vehicle based on at least one of an input signal from a vehicle state sensor for detecting a physical state amount indicative of the behavior of the subject vehicle, an input signal from a surrounding monitoring sensor, and data received via inter-vehicle communication; and a report processing unit that is configured to transmit vehicle behavior data indicative of the behavior of at least one of the subject vehicle and the other vehicle to the server when the subject vehicle passes through a point within a predetermined distance from the obstacle registration point, wherein the report processing unit is configured to, when the subject vehicle travels within a predetermined distance from the obstacle registration point, voluntarily transmit the vehicle behavior data regardless of whether the subject vehicle performs a predetermined avoidance action, and the report processing unit is further configured to, when the subject vehicle travels out of the predetermined distance from the obstacle registration point, transmit the vehicle behavior data upon satisfying one of a condition that the subject vehicle performs the avoidance action, a condition that the other vehicle performs the avoidance action, and a condition that the surrounding monitoring sensor detects the obstacle.

16. The vehicle device according to claim 15, wherein an output signal from the surrounding monitoring sensor as an in-vehicle camera and an output signal from a distance measuring sensor are input to the vehicle device, the vehicle behavior data is a data set indicative of the vehicle behavior of the subject vehicle or the other vehicle at a plurality of time points, and the report processing unit is configured to change, according to a type of a road on which the subject vehicle travels, a sampling interval for information that is included in the vehicle behavior data and is indicative of the vehicle behavior.

17. The vehicle device according to claim 15, further comprising:

an avoidance action determination unit that is configured to determine whether the subject vehicle has performed a predetermined avoidance action for avoiding the obstacle on the road based on the input signal from the vehicle state sensor for detecting the physical state amount indicative of the behavior of the subject vehicle; and an external information acquisition unit that is configured to acquire image data captured by an in-vehicle camera for capturing a vehicle outside image, wherein the avoidance action determination unit is configured to specify an avoidance direction taken by the subject vehicle during the avoidance action, and the report processing unit is configured to transmit a portion of the image data in which an object registered as the obstacle is shown in association with position information to the server when the avoidance action determination unit determines that the avoidance action is performed, wherein the portion of the image data is determined according to the avoidance direction and is a portion of at least one of a plurality of image data that are acquired within a predetermined time period after the avoidance action was performed.

18. The vehicle device according to claim 15, further comprising:

an avoidance action determination unit that is configured to determine whether the subject vehicle has performed a predetermined avoidance action for avoiding the obstacle on the road based on the input signal from the vehicle state sensor for detecting the physical state amount indicative of the behavior of the subject vehicle; and an external information acquisition unit that is configured to acquire image data captured by an in-vehicle camera for capturing a vehicle outside image, wherein the avoidance action determination unit is configured to specify an avoidance direction taken by the subject vehicle during the avoidance action, the report processing unit is configured to, when the avoidance action is performed, identify an object existing in front of the subject vehicle as an avoidance object candidate by analyzing the image data acquired within a predetermined time period after the avoidance action was performed, if at least one avoidance object candidate is obtained, the report processing unit is configured to specify, from the at least one avoidance object candidate, an avoidance object which is the object avoided by the subject vehicle based on the avoidance direction, and the report processing unit is configured to transmit, in association with position information, the image data in which the avoidance object is shown to the server.

19. The vehicle device according to claim 15, further comprising:

an avoidance action determination unit that is configured to determine whether the subject vehicle has performed a predetermined avoidance action for avoiding the obstacle on the road based on the input signal from the vehicle state sensor for detecting the physical state amount indicative of the behavior of the subject vehicle; and an external information acquisition unit that is configured to acquire image data captured by an in-vehicle camera for capturing a vehicle outside image, wherein the avoidance action determination unit is configured to specify an avoidance direction taken by the subject vehicle during the avoidance action, and the report processing unit is configured to transmit, to the server, a partial image that is cut out from the image data acquired within a predetermined time period after the avoidance action was performed, wherein the partial image is a portion of the image data that is determined according to the avoidance direction or a portion of the image data in which the object registered as the obstacle is shown.

* * * * *